US011531332B2

(12) United States Patent
Zhang et al.

(10) Patent No.: US 11,531,332 B2
(45) Date of Patent: Dec. 20, 2022

(54) REMOTE CONTROL AND MOTORIZED DEVICE

(71) Applicant: AUTEL ROBOTICS CO., LTD., Guangdong (CN)

(72) Inventors: Huihua Zhang, Guangdong (CN); Zhiying Liang, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 395 days.

(21) Appl. No.: 16/800,965

(22) Filed: Feb. 25, 2020

(65) Prior Publication Data

US 2020/0192346 A1 Jun. 18, 2020

Related U.S. Application Data

(63) Continuation of application No. PCT/CN2017/115057, filed on Dec. 7, 2017.

(30) Foreign Application Priority Data

Aug. 25, 2017 (CN) ........................ 201710742670.4

(51) Int. Cl.
*G08C 17/02* (2006.01)
*G05D 1/00* (2006.01)
(Continued)

(52) U.S. Cl.
CPC ......... *G05D 1/0016* (2013.01); *B64C 39/024* (2013.01); *G05G 9/047* (2013.01); *G08C 17/02* (2013.01); *G05G 2009/04725* (2013.01)

(58) Field of Classification Search
CPC ...... G05D 1/0016; G05D 1/00; B64C 39/024; B64C 2201/146; B64C 39/02;
(Continued)

(56) References Cited

U.S. PATENT DOCUMENTS 6,340,800 B1 1/2002 Zhai et al.
9,493,232 B2 * 11/2016 Wang .................. G06F 3/04883
(Continued)

FOREIGN PATENT DOCUMENTS

CN 203400505 U 1/2014
CN 206411626 U 8/2017

OTHER PUBLICATIONS

International Serach Report dated Mar. 30, 2018, PCT/CN2017/115057.

*Primary Examiner* — Yonel Beaulieu

(57) ABSTRACT

The present invention relates to the field of remote-control technology, and provides a remote control for remotely controlling a motorized device, the remote control including a first rocking lever device, a second rocking lever device, a processor and a signal transmitting device. A rod of the first rocking lever device is configured to perform a linear movement along a first direction and a second direction, so as to trigger the remote control to generate a first remote control instruction and a second remote control instruction, and is further configured to rotate along a third rotation direction and a fourth rotation direction, so as to trigger the remote control to generate a third direction and a fourth direction. The first direction is opposite to the second direction, and the third direction is opposite to the fourth direction. The processor is connected to the first rocking lever device and the second rocking lever device to process the first remote control instruction, the second remote control instruction, the third remote control instruction and the fourth remote control instruction.

19 Claims, 21 Drawing Sheets

400
100
First rocking lever device
200
Second rocking lever device
410
Processor
420
Signal transmitting device

(51) Int. Cl.
*B64C 39/02* (2006.01)
*G05G 9/00* (2006.01)
*G05G 9/047* (2006.01)

(58) Field of Classification Search
CPC ......... G05G 9/047; G05G 2009/04725; G05G 9/04; G05G 5/00; G05G 9/00; G08C 17/02; G08C 17/00; H01H 25/00
See application file for complete search history.

(56) References Cited

U.S. PATENT DOCUMENTS

2017/0092446 A1 3/2017 Schmitz
2018/0204331 A1* 7/2018 Omari .................... B64D 47/08
2018/0247421 A1* 8/2018 DeAngelis ................ G01S 5/02
2019/0369641 A1* 12/2019 Gillett .................. G05D 1/0027

* cited by examiner

REMOTE CONTROL AND MOTORIZED DEVICE

This application is a continuation application of International Application No. PCT/CN2017/115057, filed on Dec. 7, 2017, which claims priority of Chinese Patent Application No. 201710742670.4, filed on Aug. 25, 2017, which is incorporated herein by reference in its entirety.

BACKGROUND

Technical Field

The present invention relates to the field of a remote-control technology, and in particular, to a remote control with a rocking lever device.

Related Art

At present, a remote-control technology is adopted in an increasing number of electronic products such as an unmanned aerial vehicle, an aircraft model, and an electric toy, that is, a remote control is adopted for operation.

A rocking lever device is basically disposed on the remote control, but an operation of the rocking lever device does not substantially correspond to an actual movement of a remotely controlled motorized device, and the operation of the rocking lever device is complex, thereby providing bad user experience.

SUMMARY

In order to resolve the foregoing technical problems, embodiments of the present invention provide a remote control that is easily operated.

In order to resolve the foregoing problems, an embodiment of the present invention provides a technical solution below:

a remote control is configured to remotely control a motorized device, and the remote control includes a first rocking lever device, a second rocking lever device, a processor and a signal transmitting device. A rod of the first rocking lever device is configured to perform a linear motion along a first direction or a second direction, so as to trigger the remote control to generate a first remote control instruction or a second remote control instruction, and a rod of the first rocking lever device is further configured to be rotated along a third rotation direction or a fourth rotation direction, so as to trigger the remote control to generate a third remote control instruction or a fourth remote control instruction, the first direction being opposite to the second direction, the third rotation direction being opposite to the fourth rotation direction, the first remote control instruction being used to control the motorized device to perform a linear motion along the first direction, the second remote control instruction being used to control the motorized device to perform a linear motion along the second direction, the third remote control instruction being used to control the motorized device to auto-rotate along the third rotation direction, and the fourth remote control instruction being used to control the motorized device to auto-rotate along the fourth rotation direction. The processor is connected to the first rocking lever device and the second rocking lever device and is configured to process the first remote control instruction, the second remote control instruction, the third remote control instruction and the fourth remote control instruction. The signal transmitting device is connected to the processor and is configured to receive and send the first remote control instruction, the second remote control instruction, the third remote control instruction and the fourth remote control instruction that are processed by the processor.

In some embodiments, the first rocking lever device includes: an operating lever assembly, a first magnetic element, a first circuit board and a first resetting assembly. The first magnetic element is mounted to the operating lever assembly. The first circuit board includes a first magnetic sensor, the first magnetic sensor facing the first magnetic element, the first magnetic element being driven by the operating lever assembly from an initial position of the first magnetic element to perform a linear movement along the first direction or the second direction relative to the first magnetic sensor.

In some embodiments, the first rocking lever device includes: a second magnetic element and a second circuit board, the second magnetic element being mounted to the operating lever assembly; and the second circuit board including a second magnetic sensor, the second magnetic sensor facing the second magnetic element, the second magnetic element being driven by the operating lever assembly from an initial position of the second magnetic element to be rotated along the third rotation direction or the fourth rotation direction relative to the second magnetic sensor.

In some embodiments, the first rocking lever device includes a first resetting assembly, the first resetting assembly being connected to the operating lever assembly, and the first resetting assembly being configured to reset the operating lever assembly along the second direction or the first direction, so that the first magnetic element is reset to an initial position thereof.

In some embodiments, the first rocking lever device includes a second resetting assembly, the second resetting assembly being connected to the operating lever assembly, and the second resetting assembly being configured to reset the operating lever assembly along the fourth rotation direction or the third rotation direction, so that the second magnetic element is reset to an initial position thereof.

In some embodiments, the operating lever assembly includes a first rod, a second rod and a pin shaft; central shafts of the first rod and the second rod being both disposed along the first direction and the second direction; an accommodating channel and a pin hole being disposed at the first rod, the accommodating channel being disposed along an axial direction of the first rod, and the pin hole being disposed on an outer side wall of the first rod; a sliding groove being disposed on an outer side wall of the second rod, the sliding groove being disposed along an axial direction of the second rod, and the second rod being partially accommodated in the accommodating channel and moving along the axial direction thereof relative to the first rod; and one end of the pin shaft passing through the pin hole and being accommodated in the sliding groove.

In some embodiments, the second rod is connected to the first resetting assembly and the second resetting assembly; the first magnetic element is mounted to the first rod, the first rod, the pin shaft and the first magnetic element may perform a linear movement along the first direction or the second direction relative to the second rod; and the first resetting assembly being configured to drive the pin shaft to be reset along the first direction or the second direction, so that the first magnetic element is reset to an initial position thereof.

In some embodiments, the first resetting assembly includes a fixing frame, a swinging block and an elastic element; the fixing frame including a first limiting post and being provided with a first guide groove; there being two swinging blocks, one end of one swinging block and one end of the other swinging block being jointly hinged to the fixing frame; two ends of the elastic element being connected to the other end of each of the swinging blocks, respectively; the second rod being fixedly mounted to the fixing frame; and the pin shaft passing through the first guide groove, and moving along the first direction or the second direction within the first guide groove, and the pin shaft and the first limiting post being located between the two swinging blocks.

In some embodiments, each of the swinging blocks includes a hinging end, an abutting portion and a free end, the abutting portion being located between the hinging end and the free end; two hinging ends of the two swinging blocks being jointly hinged to the fixing frame; two ends of the elastic element being connected to the two free ends of the two swinging blocks, respectively; and the pin shaft and the first limiting post are disposed side by side between the two abutting portions of the two swinging blocks.

In some embodiments, the first circuit board is fixedly mounted to the fixing frame; a lever channel being disposed at the fixing frame, the first rod and the second rod being partially accommodated in the lever channel; the second rod being connected to the second resetting assembly and the second magnetic element, where the second magnetic element may be driven by the second rod from an initial position of the second magnetic element to rotate along the third rotation direction or the fourth rotation direction relative to the second magnetic sensor; and the second resetting assembly is configured to reset the second rod along the fourth rotation direction or the third rotation direction, so that the second magnetic element is reset to an initial position thereof.

In some embodiments, the second resetting assembly includes a connecting frame, a rotating member and a torsion spring; the connecting frame including a bottom, a second limiting post and an arc-shaped inner side wall, where the arc-shaped inner side wall is connected to the bottom, one end of the second limiting post being connected to the bottom; the rotating member including a bottom plate and an arc-shaped outer side wall, where the arc-shaped outer side wall is connected to the bottom plate; an arc-shaped second guide groove being disposed at the bottom plate, a gap being formed between two ends of the arc-shaped side wall; the second limiting post passing through the second guide groove; the torsion spring being partially accommodated in a space defined by the arc-shaped outer wall, the torsion spring including two torsion spring arms, the two torsion spring arms passing through the gap and respectively abutting against both ends of the arc-shaped outer side wall; and the second rod passing through the connecting frame and the rotating member, and the second rod driving the rotating member to rotate along the third direction or the fourth direction relative to the connecting frame.

In some embodiments, the second rod includes a connecting end, the connecting end being fixedly connected to the second magnetic element.

In some embodiments, the second resetting assembly includes a fixing member, the second magnetic element being mounted to the fixing member, and the connecting end being fixedly connected to the fixing member.

In some embodiments, the second circuit board is fixedly mounted to the connecting frame.

In some embodiments, the first magnetic sensor and the second magnetic sensor are both Hall elements.

In some embodiments, a rod of the second rocking lever device is configured to move, so as to trigger the remote control to generate a remote-control instruction of translation, the remote-control instruction of translation being used to control the motorized device to move in a horizontal plane.

A motorized device is provided, including a fuselage and the foregoing remote control, the remote control being communicatively connected to the fuselage and being configured to control a flight status of the fuselage according to a remote-control instruction generated by the first rocking lever device and the second rocking lever device; where the first remote control instruction is used to control the motorized device to perform a linear motion along the first direction, the second remote control instruction is used to control the motorized device to perform a linear motion along the second direction, the third remote control instruction is used to control the motorized device to auto-rotate along the third rotation direction, and the fourth remote control instruction is used to control the motorized device to auto-rotate along the fourth rotation direction.

In some embodiments, a rod of the second rocking lever device of the remote control is configured to move, so as to trigger the remote control to generate a remote-control instruction of translation; where the remote-control instruction of translation is used to control the motorized device to move within a horizontal plane.

In some embodiments, the motorized device is an unmanned aerial vehicle.

Compared to the prior art, the first rocking lever device only performs movements along four directions: linear movements along the first direction and the second direction and rotations along the third rotation direction and the fourth rotation direction, so that the remote control is simple to operate and easily to be remembered by the user.

Through the motorized device being communicatively connected to the remote control, and being controlled by the remote control to make a response with a correspondence (a correspondence between a movement state of the fuselage and a movement state of the first remote control device or the second remote control device of the remote control), the motorized device is easily remembered by the user.

BRIEF DESCRIPTION OF THE DRAWINGS

One or more embodiments are described by way of example with reference to the corresponding accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale. Obviously, the accompanying drawings described below are only the drawings of some embodiments of the present invention, and drawings of other embodiments may also be obtained by those of ordinary skill in the art without creative efforts according to these drawings.

DETAILED DESCRIPTION

For ease of understanding the present invention, the present invention is described in further detail below with reference to the accompanying drawings and specific embodiments. It should be noted that an element described as being "fixed" to another element may be directly on the other element, or one or more intervening components may be present. An element described as being "connected" to another element may be directly connected to the other element, or one or more intervening components may be present. The orientations or positional relationships indicated by the terms "upper", "lower", "inside", "outside", "bottom", and the like used in this specification are based on the orientations or positional relationships shown in the accompanying drawings, are only used for ease of describing the present invention and simplifying the description instead of indicating or implying that a specified apparatus or element has a particular orientation or is constructed and operated in a particular orientation, and should not be construed as a limitation on the present invention. In addition, the terms "first", "second", "third", and the like are only used for description and should not be construed as indicating or implying relative importance.

Unless otherwise defined, all technical and scientific terms used herein have the same meaning as commonly understood by one of ordinary skill in the art to which the present invention belongs. In this specification, terms used in the specification of the present invention are merely intended to describe objectives of the specific embodiments, but are not intended to limit the present invention. As used herein, the term "and/or" includes any and all combinations of one or more related items listed.

In addition, the technical features provided in different embodiments of the present invention to be described below may be combined with each other as long as no conflict occurs.

Figure 1:
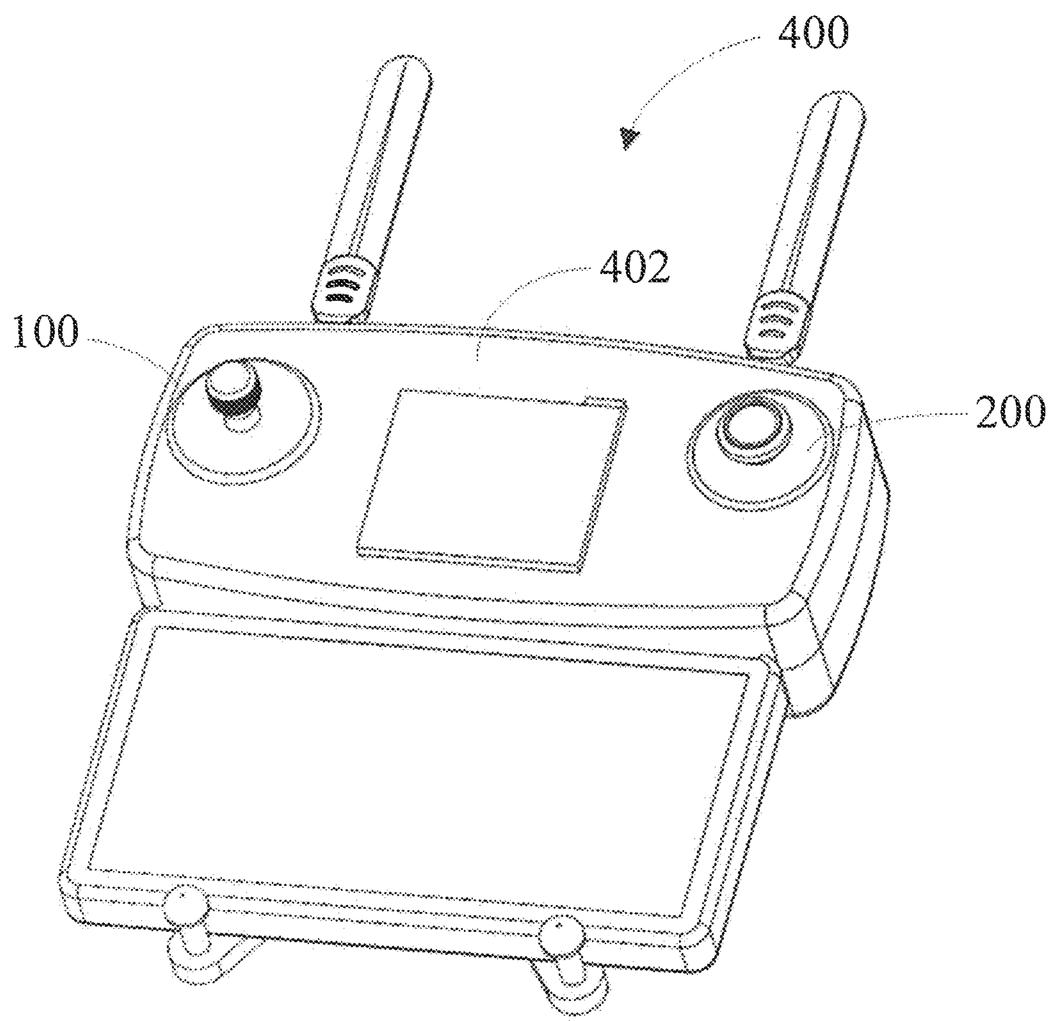
FIG. 1 is a simplified three-dimensional diagram of a remote control according to an embodiment of the present invention.

Referring to FIG. 1, a remote control 400 according to an embodiment of the present invention is used to remotely control a motorized device. The motorized device may be an unmanned aerial vehicle, an aircraft model and an electric toy, etc. The remote control 400 includes a first rocking lever device 100, a second rocking lever device 200 and a housing 402. The first rocking lever device 100 and the second rocking lever device 200 are both mounted to the housing 402.

A rod of the first rocking lever device 100 is configured to perform a linear motion along a first direction or a second direction, so as to trigger the remote control 400 to generate a first remote control instruction or a second remote control instruction, and is further configured to rotate along a third rotation direction or a fourth rotation direction, so as to trigger the remote control 400 to generate a third remote control instruction or a fourth remote control instruction. The first direction is opposite to the second direction, and the third rotation direction is opposite to the fourth rotation direction. The first remote control instruction is used to control the motorized device to perform a linear motion along the first direction, the second remote control instruction is used to control the motorized device to perform a linear motion along the second direction, the third remote control instruction is used to control the motorized device to auto-rotate along the third rotation direction, and the fourth remote control instruction is used to control the motorized device to auto-rotate along the fourth rotation direction.

A rod of the second rocking lever device 200 is configured to move, so as to trigger the remote control 400 to generate a remote-control instruction of translation. The remote-control instruction of translation is used to control the motorized device to move within a horizontal plane.

Figure 2:
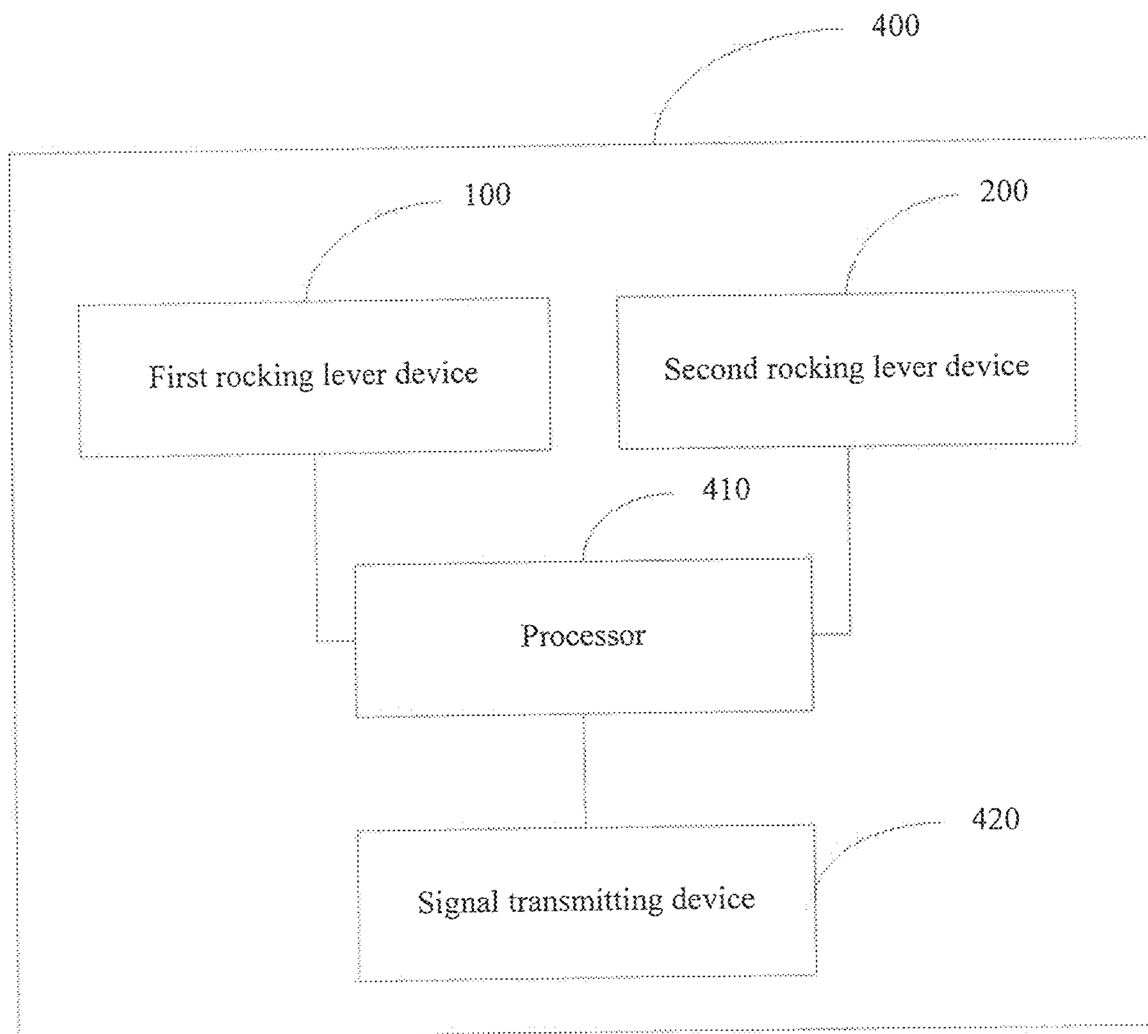
FIG. 2 is a simplified schematic diagram of functional modules of a remote control according to an embodiment of the present invention.

Referring to FIG. 2, the remote control 400 further includes a processor 410 and a signal transmitting device 420. The processor 410 is connected to the first rocking lever device 100 and the second rocking lever device 200 and is configured to process the first remote control instruction, the second remote control instruction, the third remote control instruction, the fourth remote control instruction and the remote-control instruction of translation. The signal transmitting device 420 is connected to the processor 410 and is configured to receive the first remote control instruction, the second remote control instruction, the third remote control instruction and the fourth remote control instruction that are processed by the processor 410 and the remote control instruction of translation, and send the first remote control instruction, the second remote control instruction, the third remote control instruction, the fourth remote control instruction and the remote control instruction of translation to the motorized device that is remotely controlled.

In this embodiment, the first rocking lever device 100 is used for a left-hand operation by a user, and the second rocking lever device 200 is used for a right-hand operation by the user. It may be understood that, in some other embodiments, a position of the first rocking lever device 100 and a position the second rocking lever device 200 may be reversed according to a usage habit of the user.

Figure 3:
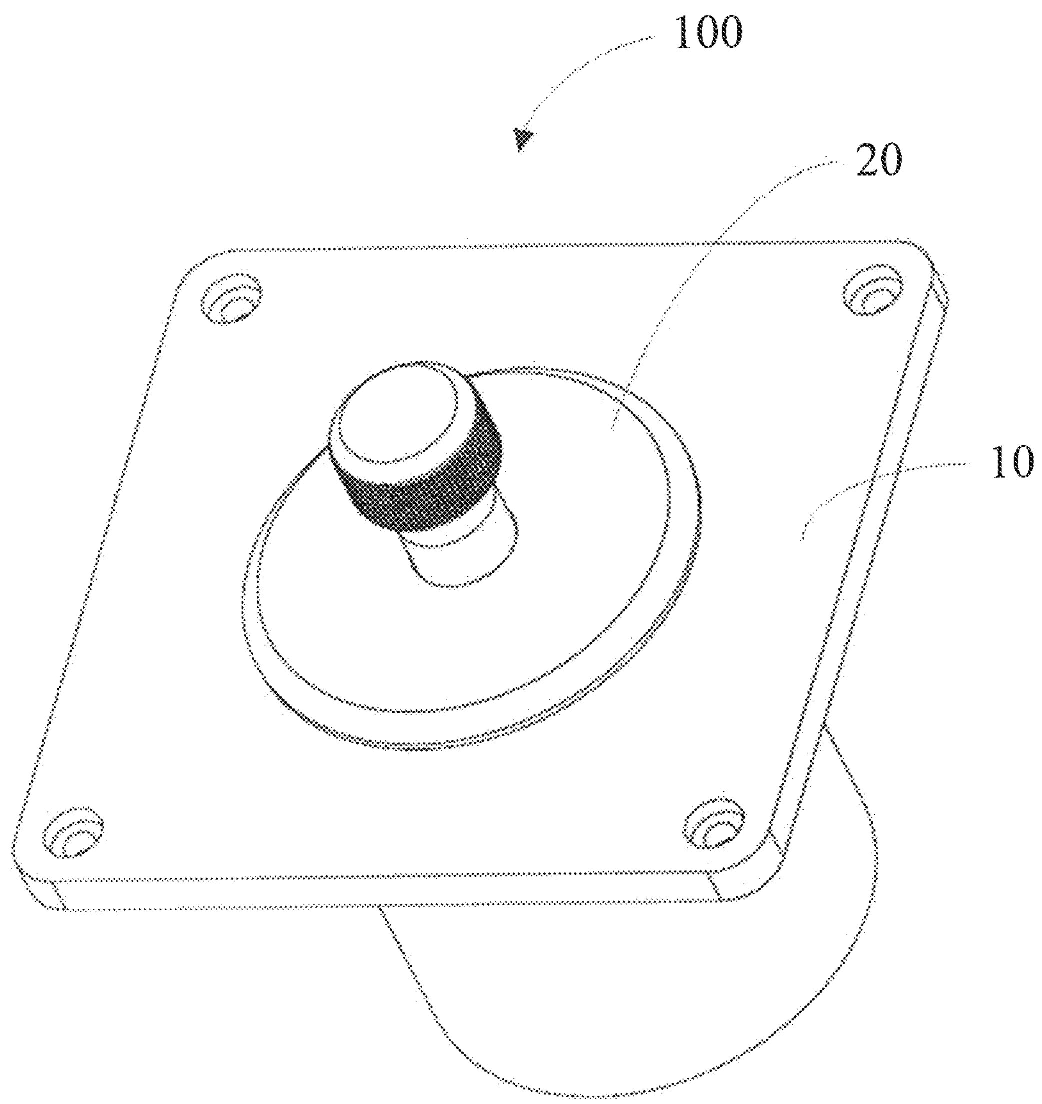
FIG. 3 is a three-dimensional diagram of a rocking lever device of the remote control shown in FIG. 1.
Figure 4:
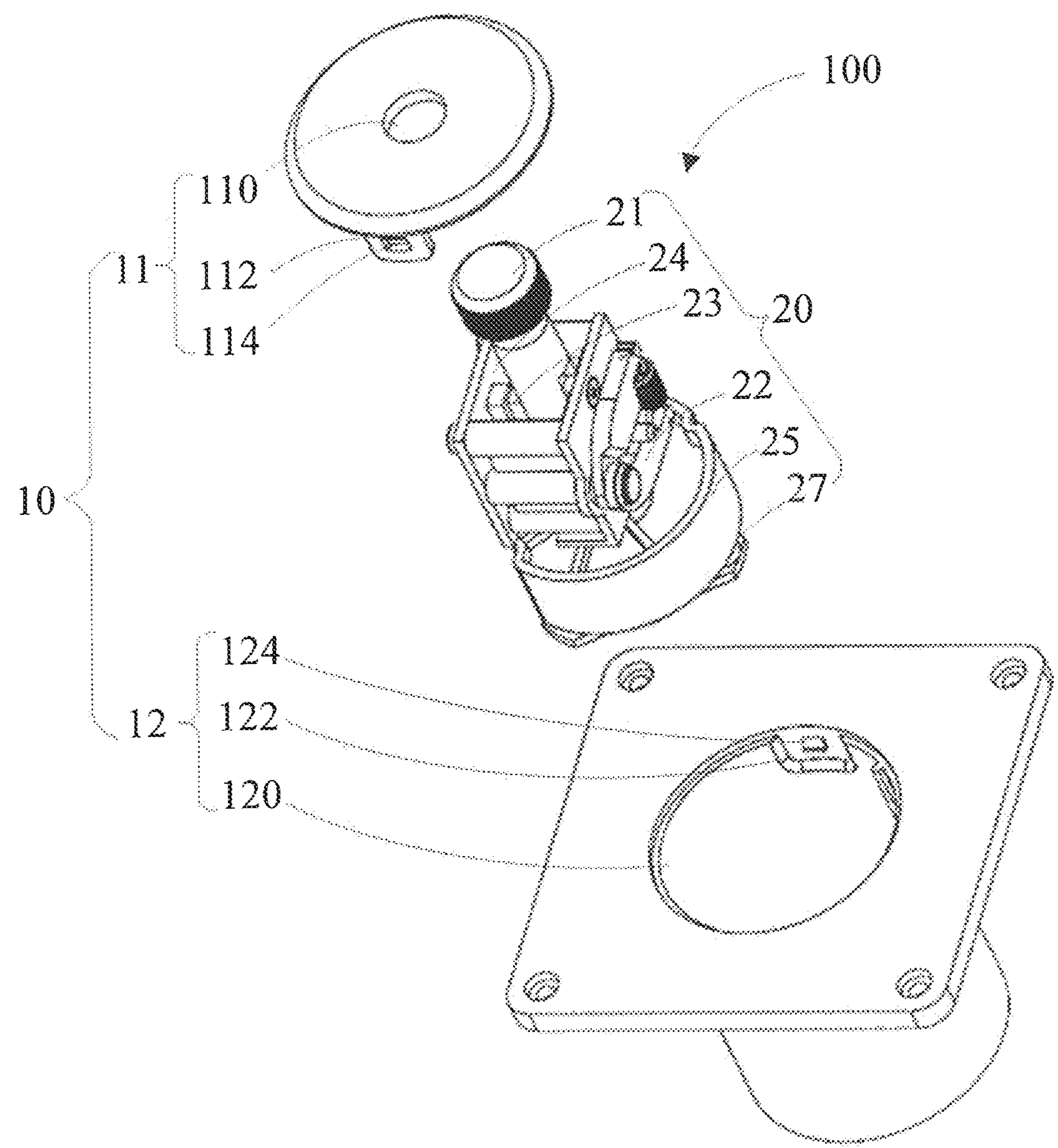
FIG. 4 is an exploded diagram of the rocking lever device shown in FIG. 3.

Referring to FIG. 3 and FIG. 4, the first rocking lever device 100 includes a housing 10 and a rocking lever mechanism 20 mounted to the housing 10.

The housing 10 includes a first housing portion 11 and a second housing portion 12. The first housing portion 11 is substantially thin plate-shaped, a rod through hole 110 being disposed in a middle portion thereof. Two opposite sides of the first housing portion 11 perpendicularly extend out two clamping blocks 112, respectively. A groove 114 is disposed on an outside of each clamping portion 112, and two grooves 114 of the two clamping portions 112 are disposed toward opposite directions.

A cylindrical cavity 120 is disposed at the second housing portion 12. Two relatively disposed clamping slots 122 are disposed at an inner wall of the cavity 120. A bump 124 is disposed at an inner wall of each clamping slot 122. When the first housing portion 11 covers an opening of the cavity 120, the clamping block 112 is correspondingly inserted into the clamping slot 122, and the groove 114 correspondingly accommodates the bump 124, facilitating rapid and accurate mounting of the first housing portion 11 to the second housing portion 12.

Figure 5:
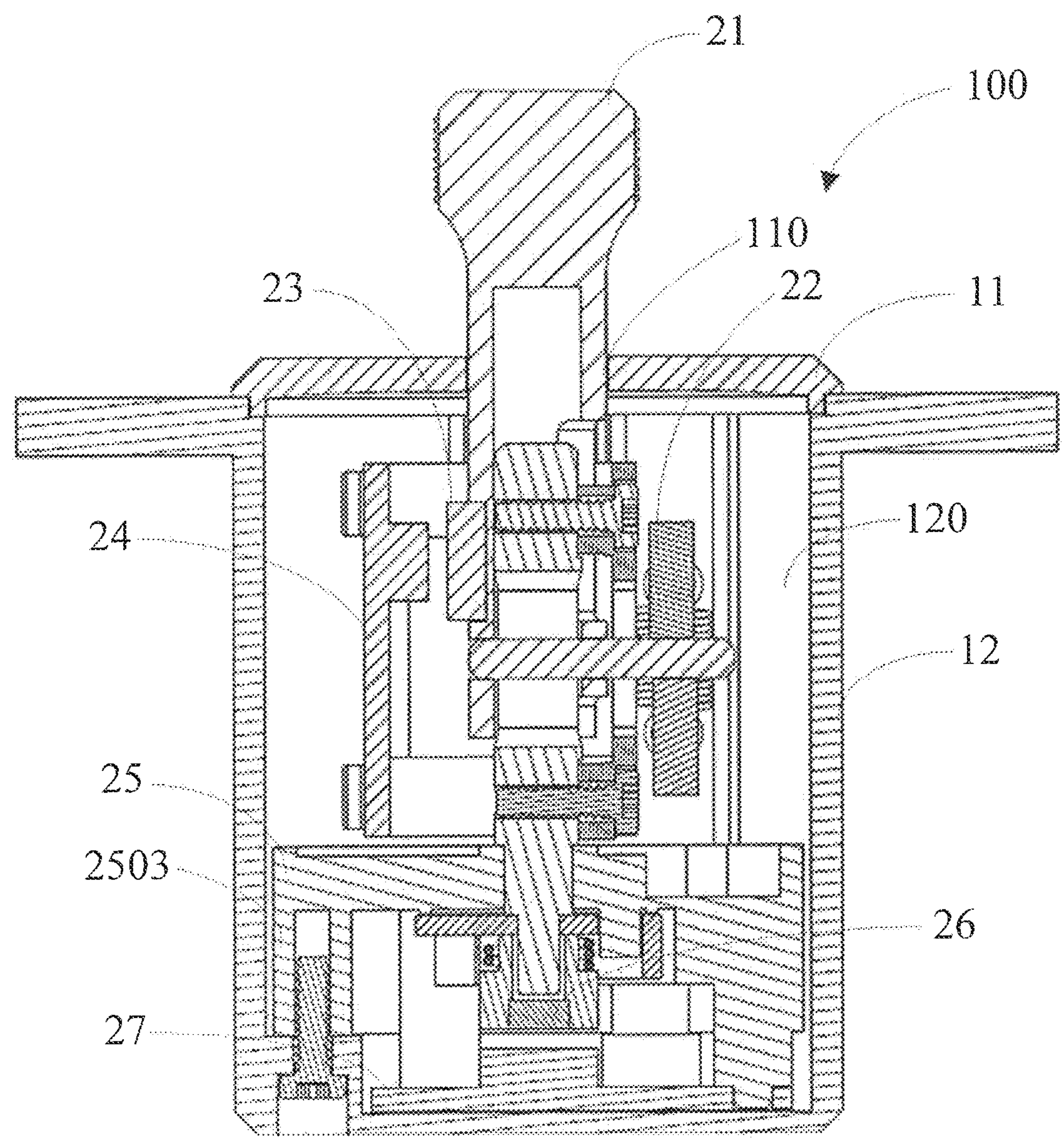
FIG. 5 is a sectional diagram of the rocking lever device shown in FIG. 4.
Figure 6:
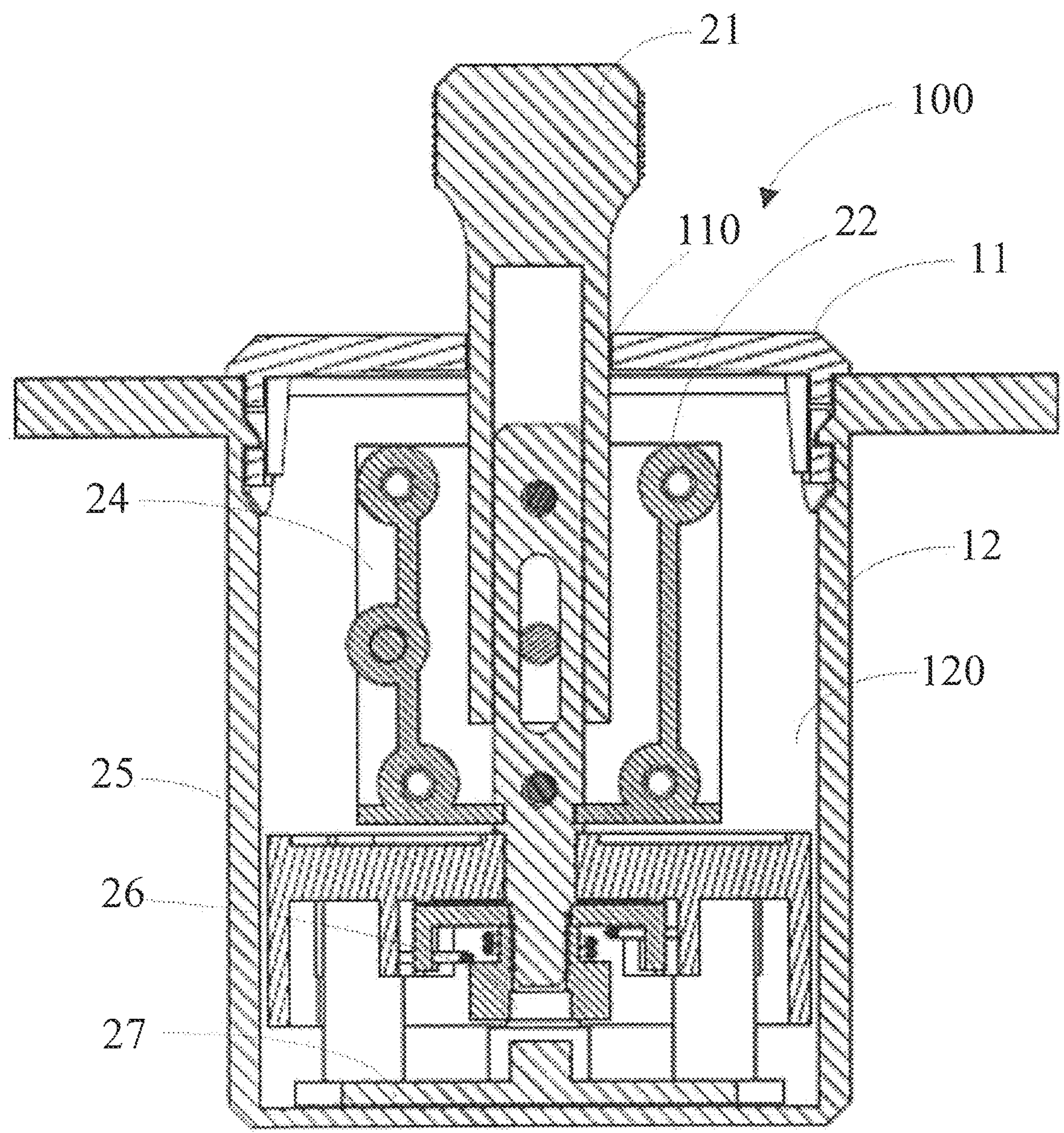
FIG. 6 is another sectional diagram of the rocking lever device shown in FIG. 3.

Referring to both FIG. 5 and FIG. 6, the rocking lever mechanism 20 includes an operating lever assembly 21, a first resetting assembly 22, a first magnetic element 23, a first circuit board 24, a second resetting assembly 25, a second magnetic element 26 and a second circuit board 27. A portion of the operating lever assembly 21 passes through the rod through hole 110 and is exposed to an outside of the housing 10. A remaining portion of the operating lever assembly 21 is accommodated in the cavity 120. The first resetting assembly 22, the first magnetic element 23, the first circuit board 24, the second resetting assembly 25, the second magnetic element 26 and the second circuit board 27 are all accommodated in the cavity 120.

The first magnetic element 23 is mounted to the operating lever assembly 21, and the first magnetic element 23 may be driven by the operating lever assembly 21 from an initial position of the first magnetic element to perform a linear motion along the first direction or the second direction relative to the first circuit board 24. The first direction is opposite to the second direction. The first resetting assembly 22 is used to reset the operating lever assembly 21 along the second direction or the first direction, so that the first magnetic element 23 is reset to an initial position thereof. The second magnetic element 26 is mounted to the operating lever assembly 21, and the second magnetic element 26 may be driven by the operating lever assembly 21 from an initial position of the second magnetic element to rotate around a third rotation direction or a fourth rotation direction relative to the second circuit board 27. The second resetting assembly 25 is used to reset the operating lever assembly 21 along the fourth rotation direction or the third rotation direction, and drive the two magnetic elements 26 to be reset to initial positions of the two magnetic elements. The third rotation direction is opposite to the fourth rotation direction.

Figure 7:
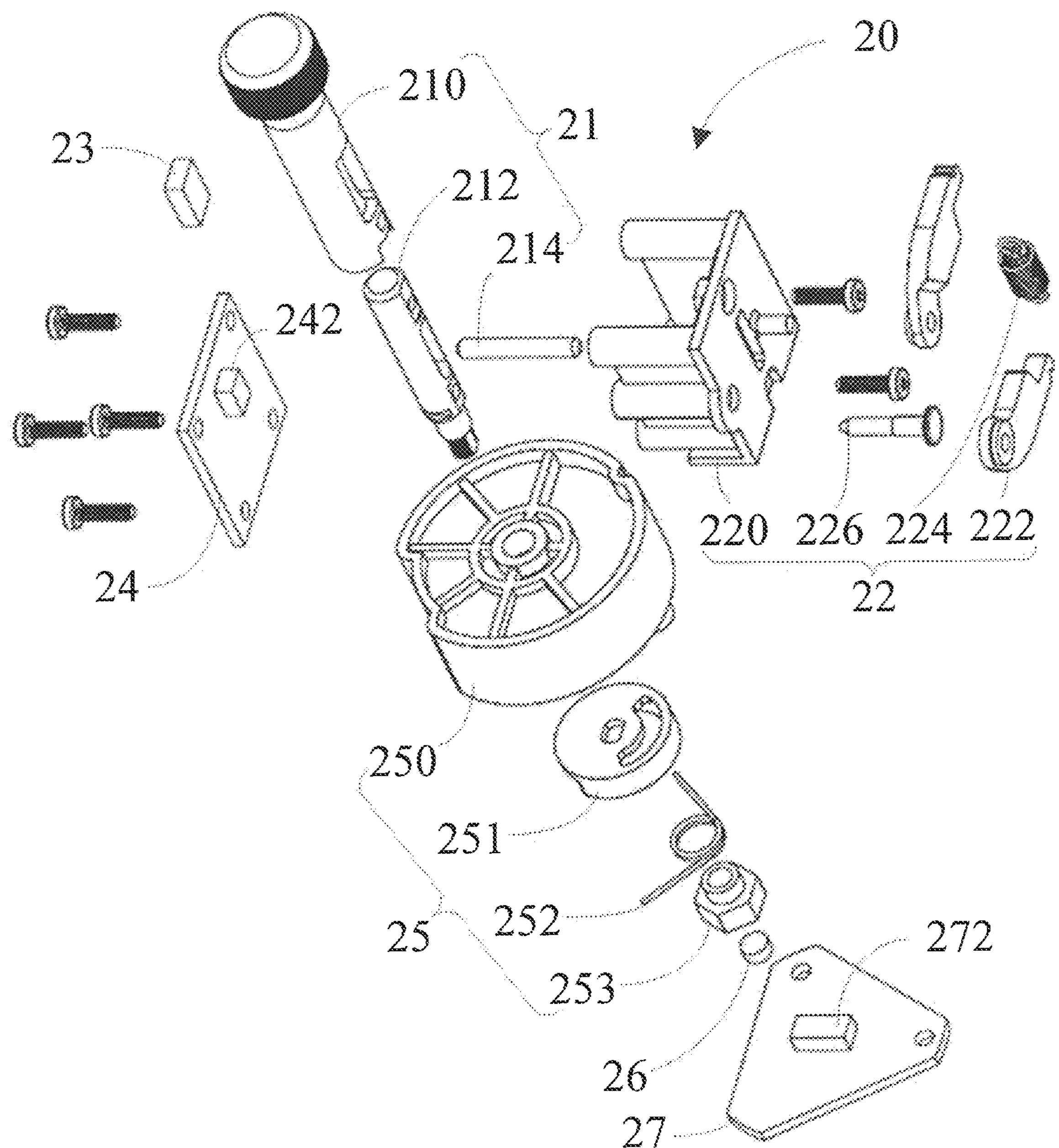
FIG. 7 is an exploded diagram of a rocking lever mechanism of the rocking lever device shown in FIG. 3.
Figure 8:
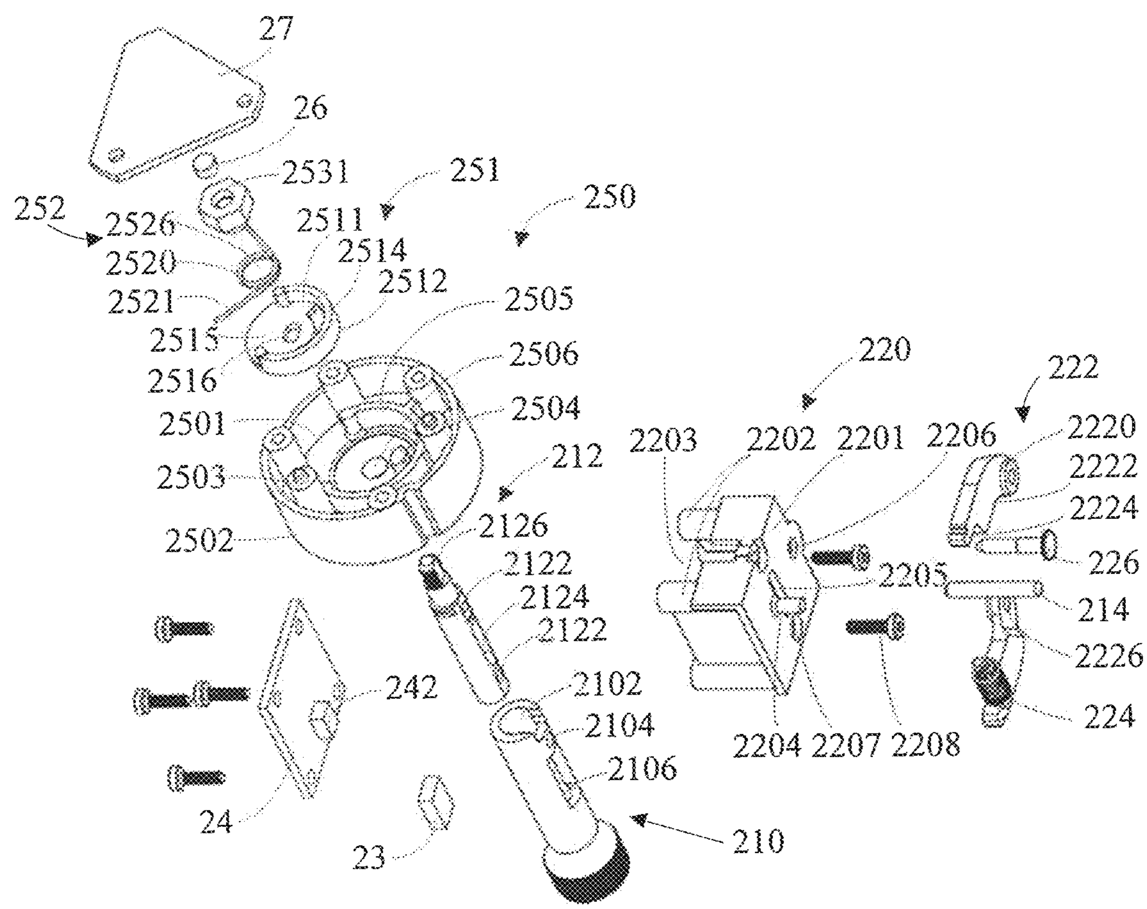
FIG. 8 is an exploded diagram of the rocking lever device shown in FIG. 7 from another perspective.

Referring to FIG. 7 and FIG. 8, the operating lever assembly 21 includes a first rod 210, a second rod 212 and a pin shaft 214.

The first rod 210 is a hollow cylinder. An accommodating channel 2102, a pin hole 2104 and a slot 2106 are disposed at the first rod. The accommodating channel 2102 is disposed along an axial direction of the first rod 210 and has an opening at one end of the first rod 210. The slot 2106 and the pin hole 2104 are disposed on an outer side wall of the first rod 210, and the slot 2106 and the pin hole 2104 are in communication with the accommodating channel 2102.

The second rod 212 is a cylinder, two threaded holes 2122 and a sliding groove 2124 being disposed on an outer side wall of the second rod. The sliding groove 2124 is elongated, and is disposed along an axial direction of the second rod 212. The two threaded holes 2122 are disposed on both sides of the sliding groove 2124 along the axial direction of the second rod 212.

The second rod 212 includes a connecting end 2126, an outer side wall of the connecting end 2126 having an internal thread, and the connecting end 2126 has an elliptical cross section for rotation limitation. The second rod 212 is partially accommodated in the accommodating channel 2102 and may move along an axial direction of the second rod relative to the first rod 210.

One end of the pin shaft 214 passes through the pin hole 2104 of the first rod 210, is accommodated in the sliding groove 2124 of the second rod 212, and may slide in the sliding groove 2124.

The first magnetic element 23 is mounted to the first rod 210. The first rod 210, the pin shaft 214 and the first magnetic element 23 may perform a linear movement along the first direction or the second direction relative to the second rod 212. In this embodiment, central shafts of the first rod 210 and the second rod 212 are both disposed along the first direction and the second direction.

The first resetting assembly 22 includes a fixing frame 220, a swinging block 222, an elastic element 224 and a fixing shaft 226.

The fixing frame 220 is substantially rectangular and includes a mounting plate 2201 and a supporting block 2202. The two supporting blocks 2202 perpendicularly extend from two opposite sides of the mounting plate 2201. A rod channel 2203 is disposed between the two supporting blocks 2202. The first rod 210 and the second rod 212 are partially accommodated in the rod channel 2203, and the first circuit board 24 is mounted to the two supporting blocks 2202 through a plurality of screws. The first circuit board 24, the two supporting blocks 2202 and the mounting plate 2201 surround the first rod 210 and the second rod 212.

The mounting plate 2201 includes a first limiting post 2204, one end of the first limiting post 2204 being perpendicularly connected to a surface that is of the mounting plate 2201 and that faces away from the supporting block 2202. A first guide groove 2205, a first mounting hole 2206 and a second mounting hole 2207 are disposed on the mounting plate 2201. The first guide groove 2205 is elongated and is disposed along an axial direction of the first rod 210. The first mounting hole 2206 and the first limiting post 2204 are located on two opposite sides of the first guide groove 2205, and the two second mounting holes 2207 are located on the other two opposite sides of the first guide groove 2205. After two screws 2208 pass through the two second mounting holes 2207, the two screws are inserted into the two threaded holes 2122 of the second rod 212 to fix the second rod 212 to the mounting plate 2201.

There are two swinging blocks 222. Each swinging block 222 includes a hinging end 2220, an abutting portion 2222 and a free end 2224. The abutting portion 2222 is located between the hinging end 2220 and the free end 2224. A hinging hole 2226 is disposed at the hinging end 2220. After the fixing shaft 226 passes through the two hinging holes 2226 of the two swinging blocks 222, the fixing shaft is inserted into the first mounting hole 2206 and hinges the two swinging blocks 222 to the mounting plate 2201.

One end of the elastic element 224 is connected to the free end 2224 of one swinging block 222, and the other end of the elastic element 224 is connected to the free end 2224 of the other swinging block 222.

The pin shaft 214 passes through the first guide groove 2205 and is sandwiched with the first limiting post 2204 side by side between two abutting portions 2222 of the two swinging blocks 222.

In this embodiment, the elastic element 224 is a tension spring. It may be understood that, in some other embodiments, the elastic element 224 may be other elastic elements that may provide a resilient tension, such as a rubber band.

The first circuit board 24 includes a first magnetic sensor 242. The magnetic sensor 242 faces the first magnetic element 23, and is configured to sense a change in a magnetic field of the first magnetic element 23 and obtain a moving position of the first magnetic element 23. The first circuit board 24 generates a corresponding remote-control instruction according to the moving position of the first magnetic element 23 obtained through the first magnetic sensor 242. In this embodiment, the first magnetic sensor 242 is a Hall element. It may be understood that, in some other implementations, the first magnetic sensor 242 may be other magnetic sensors that may sense a change in the magnetic field, such as a magnetic encoder.

The second resetting assembly 25 includes a connecting frame 250, a rotating member 251, a torsion spring 252 and a fixing member 253.

The connecting frame 250 is a hollow cylinder, which includes a circular bottom 2501, an annular outer side wall 2502, a mounting post 2503, a second limiting post 2504 and an arc-shaped inner side wall 2505. The annular side wall 2502 is perpendicularly connected to an outer edge of the circular bottom 2501. Similarly, the arc-shaped inner side wall 2505 is perpendicularly connected to the circular bottom 2501. One end of the second limiting post 2504 and one end of the mounting post 2503 are perpendicularly connected to the circular bottom 2501. A circular first shaft through hole 2506 is disposed in a middle of the circular bottom 2501. The annular outer side wall 2502 and the arc-shaped inner side wall 2505 surround the first shaft through hole 2506 with the first shaft through hole 2506 as a center. The second limiting post 2504 is located between the first shaft through hole 2506 and the arc-shaped inner side wall 2505. The arc-shaped inner side wall 2505 is located between the second limiting post 2503 and the circular outer side wall 2502. The mounting post 2503 is in contact with an inner surface of the annular side wall 2502.

The rotating member 251 includes a circular bottom plate 2511 and an arc-shaped outer side wall 2512. The arc-shaped outer side wall 2512 is perpendicularly connected to an outer edge of the circular bottom plate 2511. An arc-shaped second guide groove 2514 and a second shaft through hole 2516 are disposed in the circular bottom plate 2511. A cross section of the second shaft through hole 2516 is substantially oval and is disposed in a middle of the circular bottom plate 2511. The second guide groove 2514 is located between the second shaft through hole 2516 and the arc-shaped outer side wall 2512. A gap 2515 is formed between two ends of the arc-shaped side wall 2512.

The rotating member 251 is accommodated in a space defined by the arc-shaped inner side wall 2505. The second limiting post 2504 passes through the second guide groove 2514. The first shaft through hole 2506 is aligned with the second shaft through hole 2516.

The connecting frame 250 and the rotating member 251 are made of a plastic material by injection molding.

The torsion spring 252 includes a torsion spring body 2520 and two torsion spring arms 2521. The torsion spring body 2520 has a third shaft through hole 2526. The two torsion spring arms 2521 are connected to the torsion spring body 2520, respectively. The torsion spring body 2520 is accommodated in a space defined by the arc-shaped outer side wall 2512. The third shaft through hole 2526 is aligned with the second shaft through hole 2516. The two torsion spring arms 2521 are exposed from the gap 2515 and abut against two ends of the arc-shaped outer side wall 2512, respectively.

An accommodating hole 2531 is disposed in the fixing member 253. The second magnetic element 26 is accommodated in the accommodating hole 2531 and faces the second circuit board 27. The fixing member 253 is partially accommodated in the third shaft through hole 2526. In this embodiment, the fixing member 253 is a fixing nut.

A connecting end 2126 of the second rod 212 passes through the first shaft through hole 2506 and the second shaft through hole 2516 successively, and finally is fixedly connected to the fixing member 253. A cross section of the connecting end 2126 is substantially oval, and a cross section of the second shaft through hole 2513 is substantially oval, so that when the connecting end 2126 is rotated, the rotating member 251 and the fixing member 253 may be driven to rotate relative to the connecting frame 250. It may be understood that, in some other embodiments, the cross section of the connecting end 2126 and the cross section of the second shaft through hole 2513 may be other rotation limiting structures, for example, the cross section of the connecting end 2126 and the cross section of the second shaft through hole 2513 may be D-shaped.

The second circuit board 27 includes a second magnetic sensor 272. The second magnetic sensor 272 faces the second magnetic element 26 and is configured to sense a change in a magnetic field of the second magnetic element 26 and obtain a moving position of the second magnetic element 26. The second circuit board 27 generates a corresponding remote-control instruction according to the moving position of the second magnetic element 26 obtained through the second magnetic sensor 272. The second circuit board 27 is fixedly connected to the connecting frame 250. In this embodiment, the second magnetic sensor 272 is a Hall element. It may be understood that, in some other implementations, the second magnetic sensor 272 may be other magnetic sensors that may sense a change in the magnetic field, such as a magnetic encoder.

Figure 9:
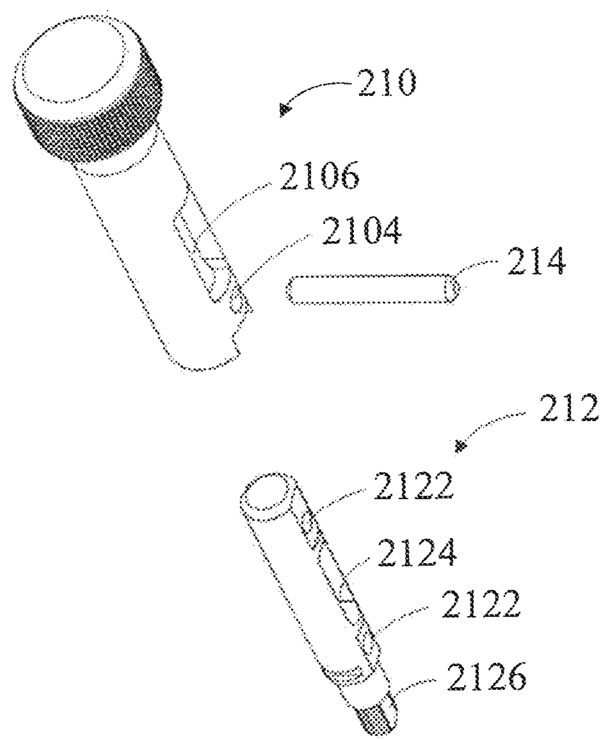
FIG. 9 is an exploded diagram of an operating lever assembly of the rocking lever mechanism shown in FIG. 7.
Figure 10:
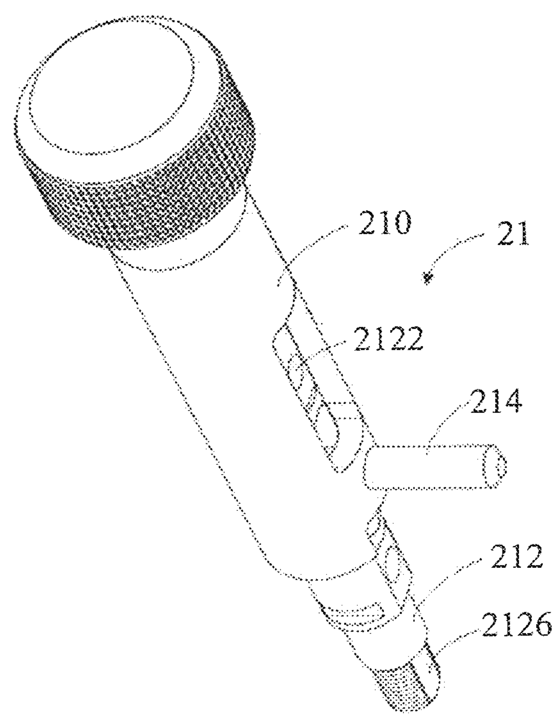
FIG. 10 is a three-dimensional diagram of the operating lever assembly shown in FIG. 9.
Figure 11:
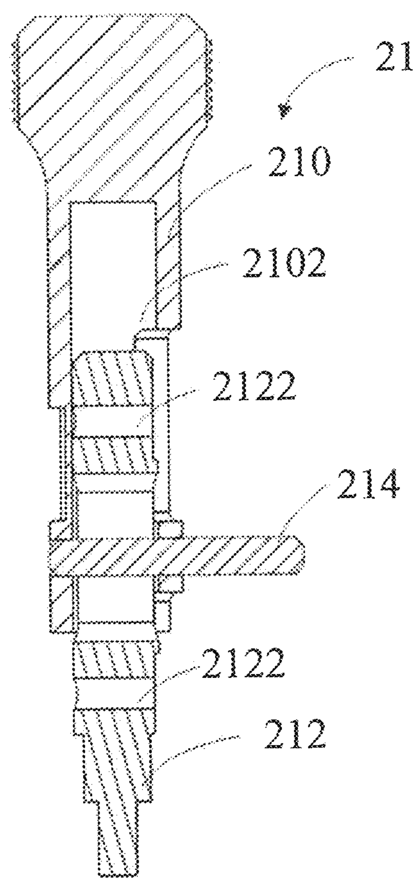
FIG. 11 is a sectional diagram of the operating lever assembly shown in FIG. 9.

During assembly, referring to FIG. 9 to FIG. 11, the second rod 212 is inserted into an accommodating channel 2102 of the first rod 210. One end of the pin shaft 214 is inserted into the sliding groove 2124 of the second rod 212 after passing through the pin hole 2104, so that the operating lever assembly 21 is obtained through assembly. One of the two threaded holes 2122 is exposed from the slot 2106. The connecting end 2126 is exposed outside the accommodating channel 2102. When the first rod 210 and the pin shaft 214 perform linear movements along the first direction or the second direction, one end of the pin shaft 214 moves in the sliding groove 2124.

Figure 12:
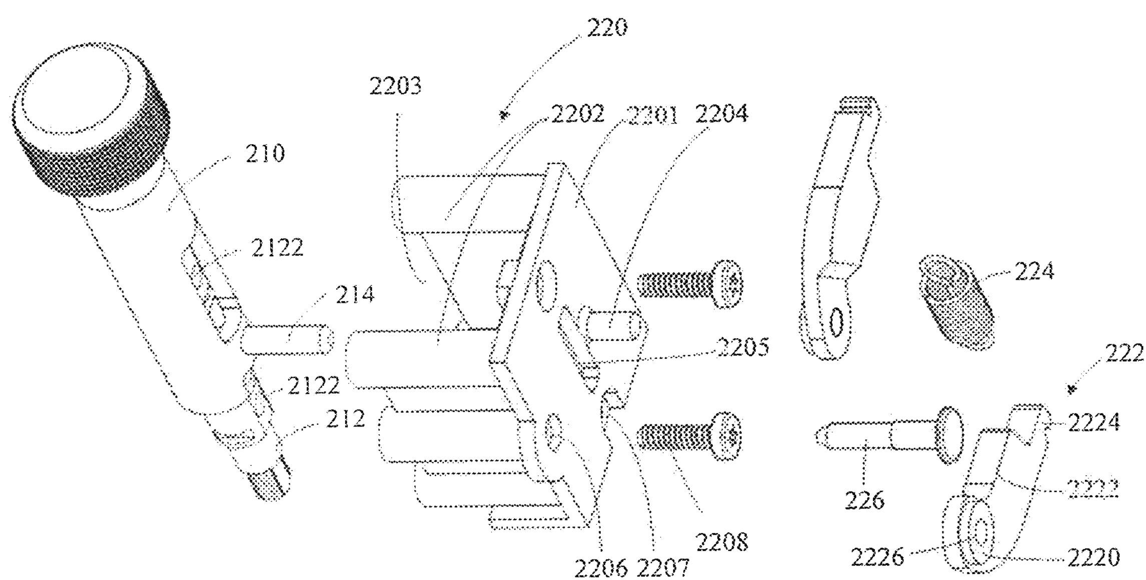
FIG. 12 is a schematic assembly diagram of the operating lever assembly of the rocking lever mechanism shown in FIG. 7 and a first resetting assembly.
Figure 13:
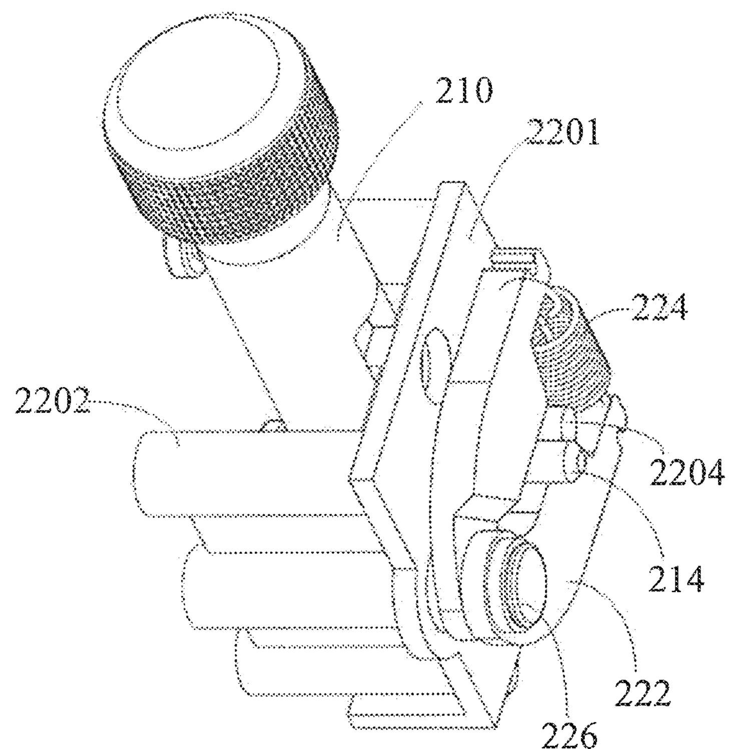
FIG. 13 is a three-dimensional diagram of the operating lever assembly and the first resetting assembly shown in FIG. 12.
Figure 14:
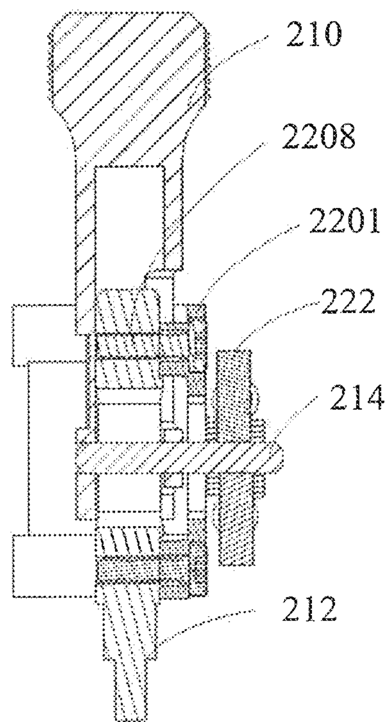
FIG. 14 is a sectional diagram of the operating lever assembly and the first resetting assembly shown in FIG. 13.

Referring to FIG. 12 to FIG. 14, the pin shaft 214 passes through the first guide groove 2205. The first rod 210 and the second rod 212 are accommodated in the rod channel 2203. After the screw 2208 passes through the second mounting hole 2207, the screw is inserted into and fixed to the screw hole 2122, so that the second rod 212 is fixed to the mounting plate 2201. Hinging holes 2226 of the two swinging members 222 are aligned with the first mounting hole 2206. After the fixing shaft 226 passes through the hinging holes 2226, the fixing shaft is inserted into and fixed to the first mounting hole 2206, so that the swinging members 222 are hinged to the mounting plate 2201. The pin shaft 214 and the first limiting post 2204 are sandwiched side by side between two abutting portions 2222 of the two swinging members 222. Two ends of the elastic element 224 are connected to two free ends 2224 of the two swinging members 222, respectively.

Figure 15:
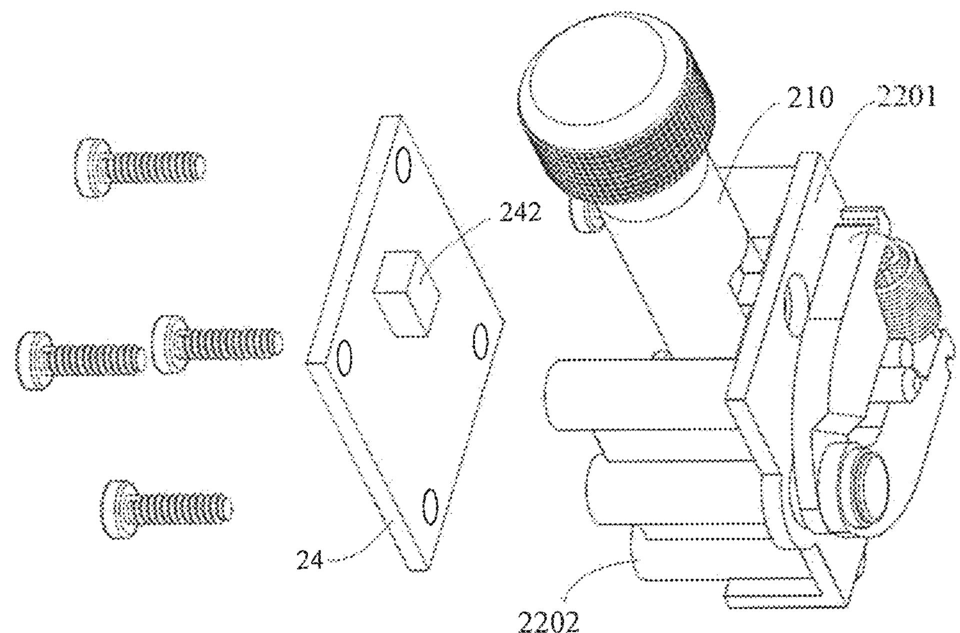
FIG. 15 is a schematic assembly diagram of the operating lever assembly of the rocking lever mechanism shown in FIG. 7, a first resetting assembly and a first circuit board.
Figure 16:
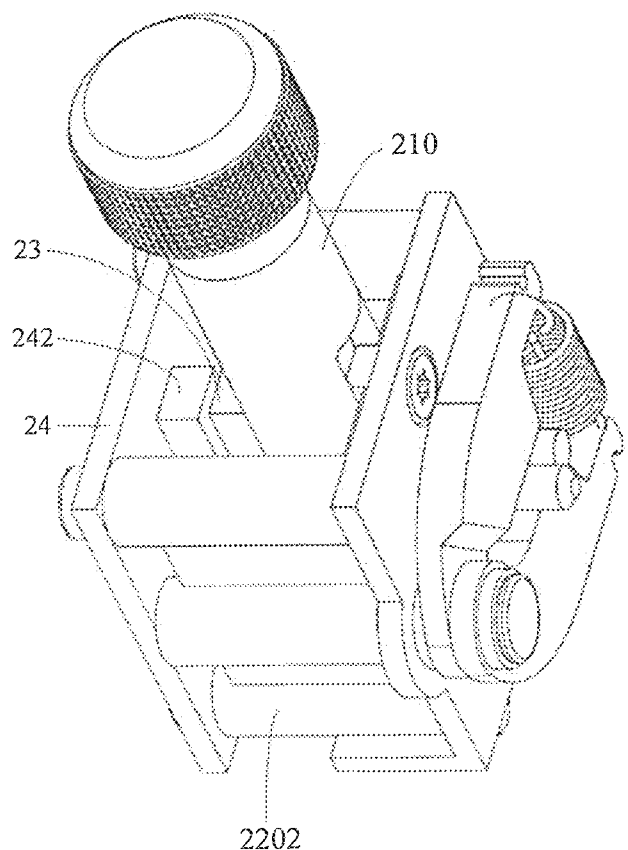
FIG. 16 is a three-dimensional diagram of the operating lever assembly, the first resetting assembly and the first circuit board shown in FIG. 15.
Figure 17:
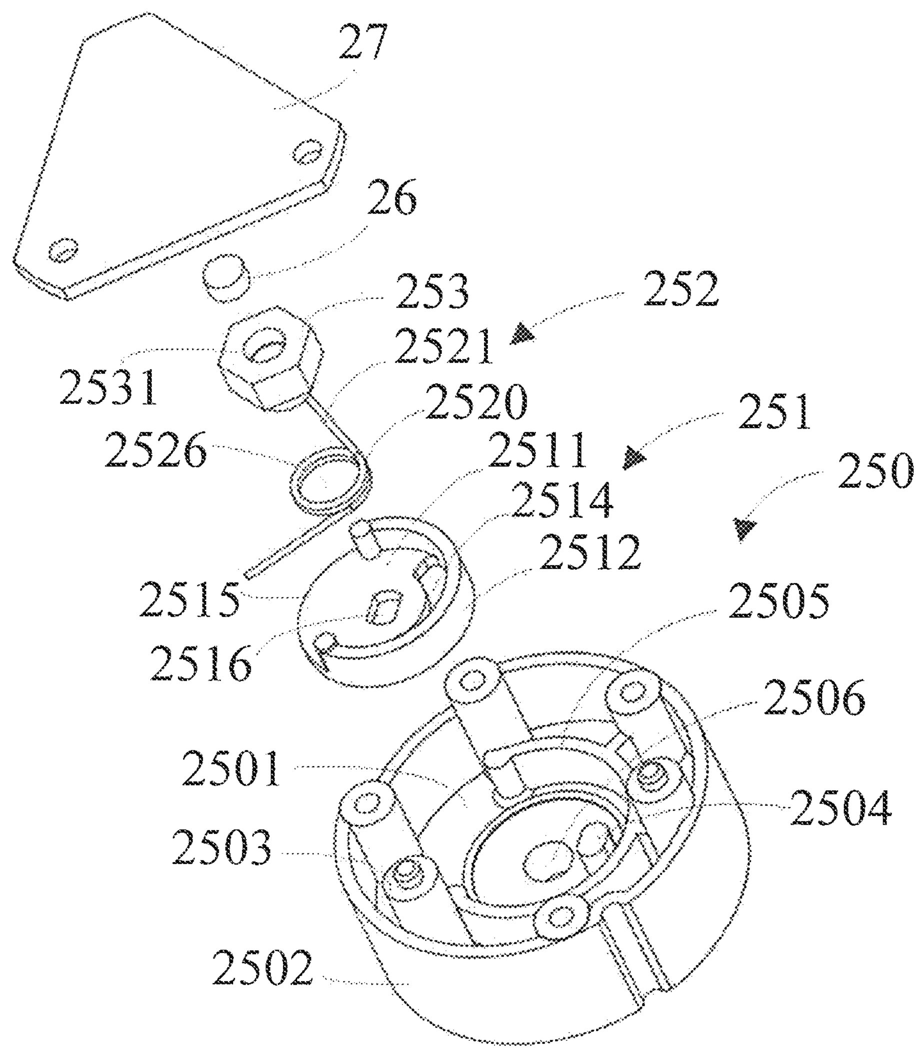
FIG. 17 is an exploded diagram of a second resetting assembly and a second circuit board of the rocking lever mechanism shown in FIG. 7.
Figure 18:
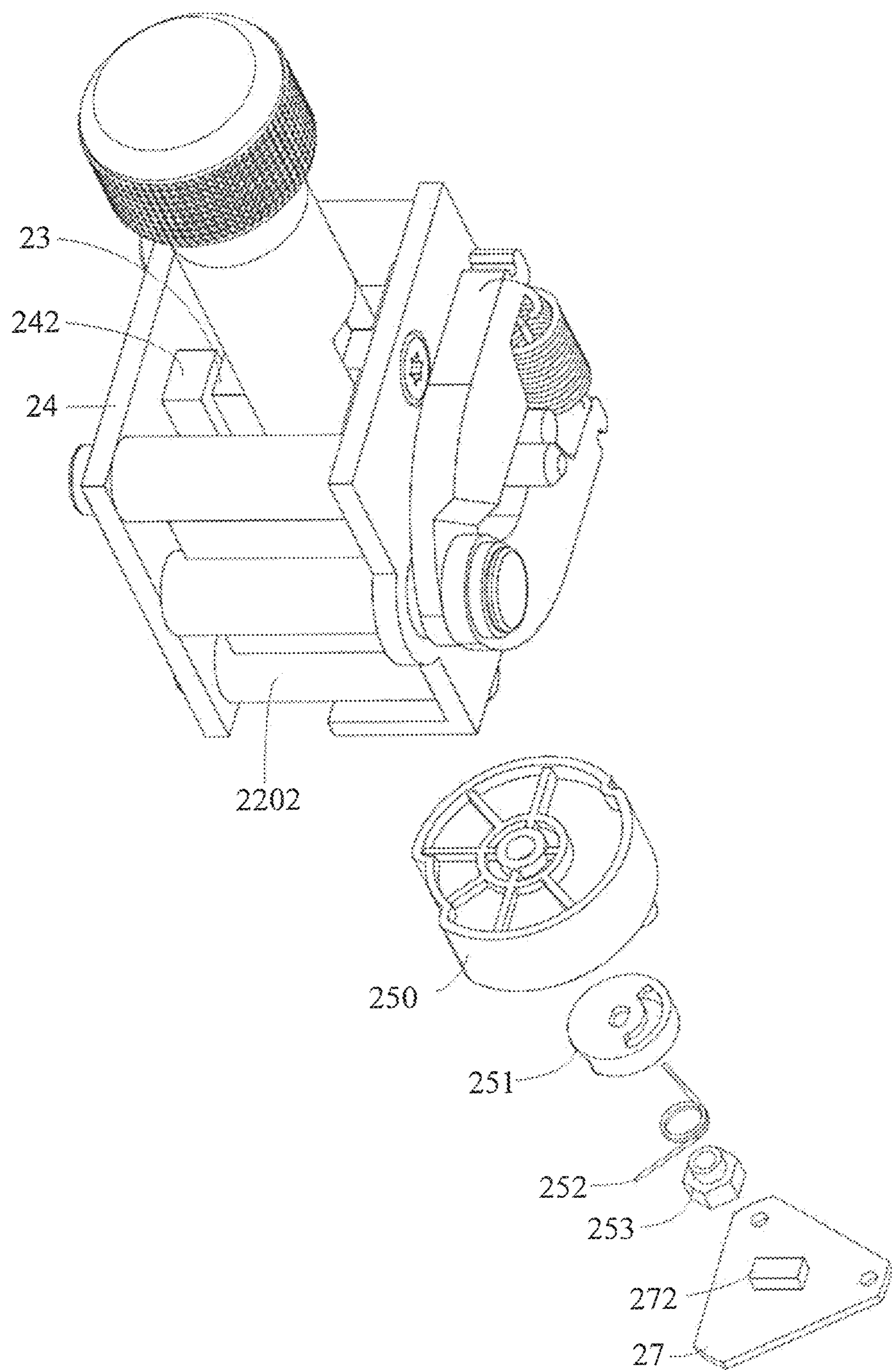
FIG. 18 is a schematic assembly diagram of an operating lever assembly, a first resetting assembly, a first circuit board, a second resetting assembly and a second circuit board according to an embodiment of the present invention.
Figure 19:
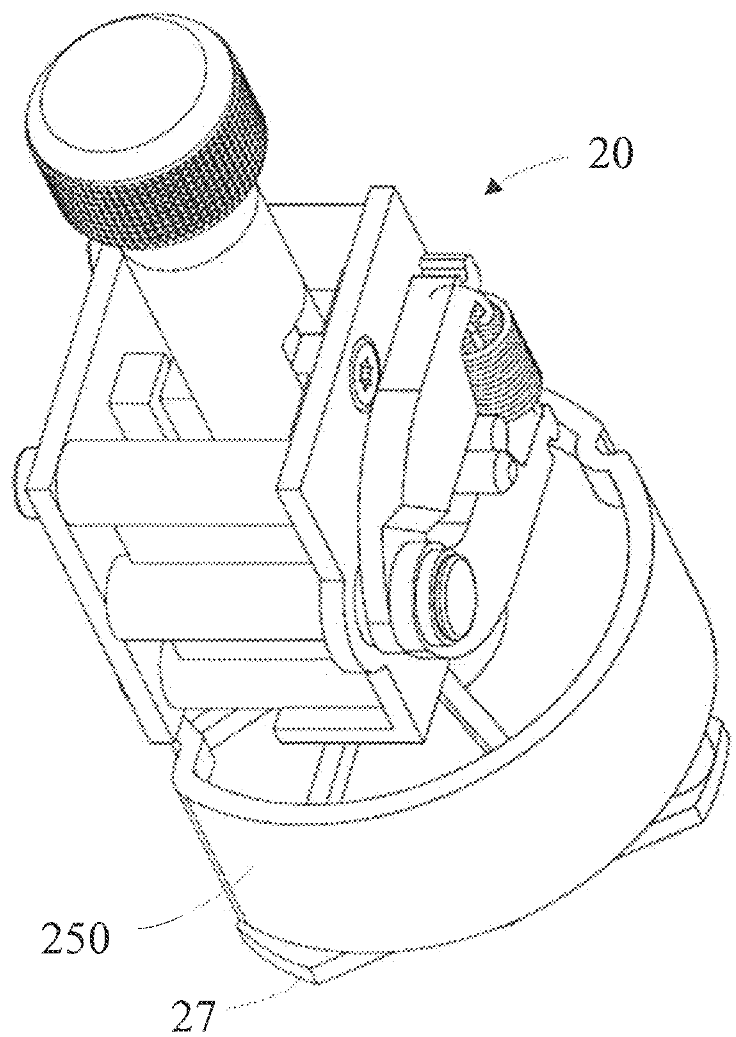
FIG. 19 is a three-dimensional diagram of an operating lever assembly, a first resetting assembly, a first circuit board, a second resetting assembly and a second circuit board according to an embodiment of the present invention.
Figure 20:
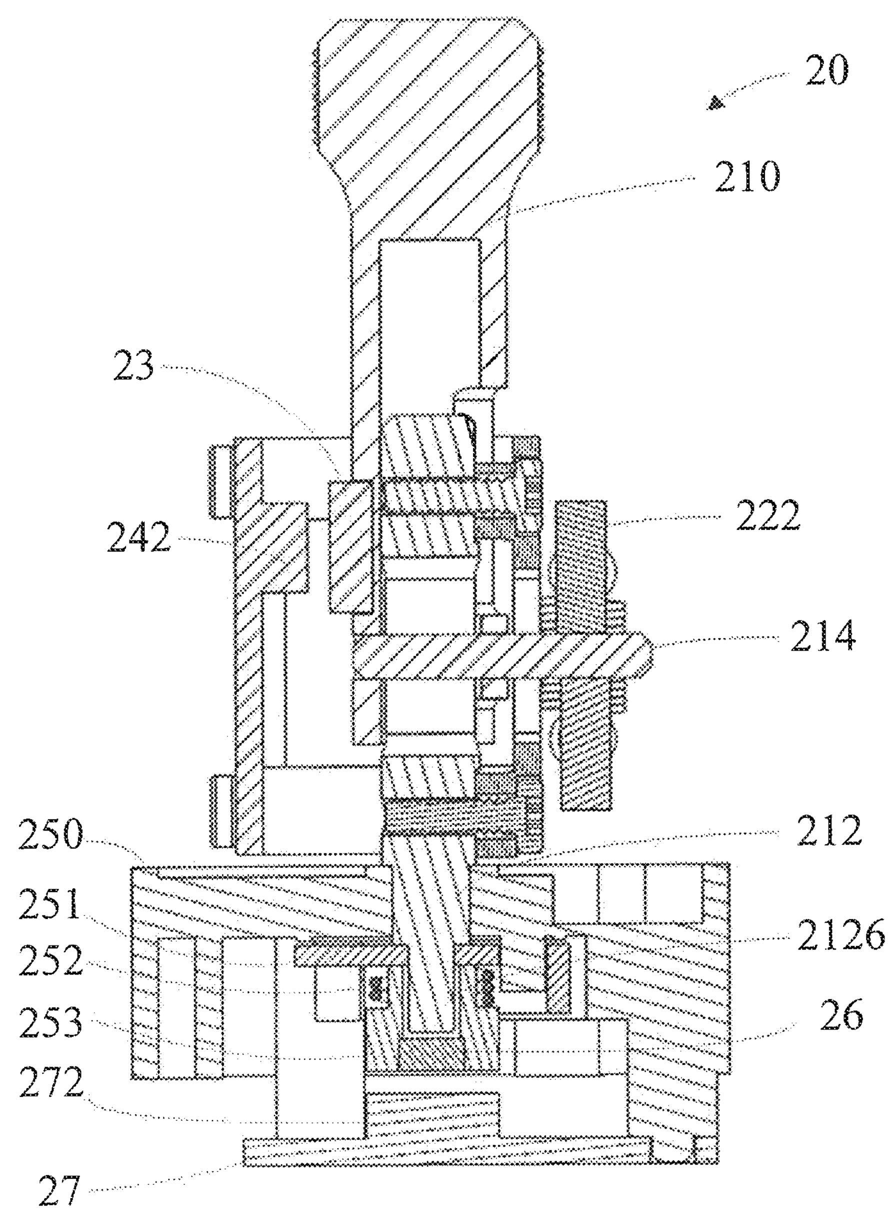
FIG. 20 is a sectional diagram of the operating lever assembly, the first resetting assembly, the first circuit board, the second resetting assembly and the second circuit board shown in FIG. 19.

Referring to FIG. 15 and FIG. 16, the first magnetic element 23 is mounted to the first rod 210, and the first circuit board 24 is fixedly mounted to the two supporting blocks 2202, so that the first magnetic sensor 242 faces the first magnetic element 23.

Referring to FIG. 17 to FIG. 20, the rotating member 251 is placed in a space defined by the arc-shaped inner side wall 2505. The second limiting post 2504 passes through the second guide groove 2514. The first shaft through hole 2506 is aligned with the second shaft through hole 2516. The torsion spring body 2520 is placed in a space defined by the arc-shaped outer side wall 2512. The third shaft through hole 2526 is aligned with the second shaft through hole 2516. The two torsion spring arms 2521 are exposed from the gap 2515 and abut against two ends of the arc-shaped outer side wall 2512, respectively. The second magnetic element 26 is fixed to an accommodating hole 2531 of the fixing member 253, and the fixing member 253 is partially accommodated in the third shaft through hole 2526. The connecting end 2126 of the second rod 212 passes through the first shaft through hole 2506 and the second shaft through hole 2516 successively, and finally is fixedly connected to the fixing member 253. The second circuit board 27 is fixedly mounted to the two mounting posts 2503 of the connecting frame 250. Therefore, the rocking lever mechanism 20 is obtained through assembly.

Figure 21:
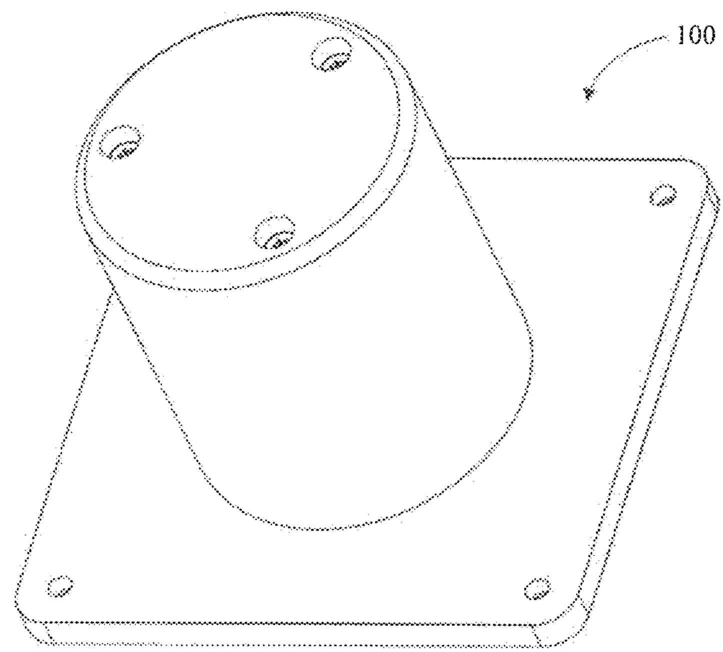
FIG. 21 is a three-dimensional diagram of a rocking lever device according to an embodiment of the present invention from another perspective.

Referring to FIG. 21, the rocking lever mechanism 20 is placed in the cavity 120, and a screw is inserted into and fixed to the three mounting posts 2503 of the connecting frame 250 after passing through a bottom of the second housing portion 12. The second circuit board 27 abuts against the bottom of the second housing portion 12. The first housing portion 11 is configured to cover an opening of the cavity 120, the clamping block 112 is correspondingly inserted into the clamping slot 122, and the groove 114 correspondingly accommodates the bump 124, so that the first rocking lever device 100 (with reference to FIG. 4) of the embodiment of the present invention is obtained through assembly.

Figure 22:
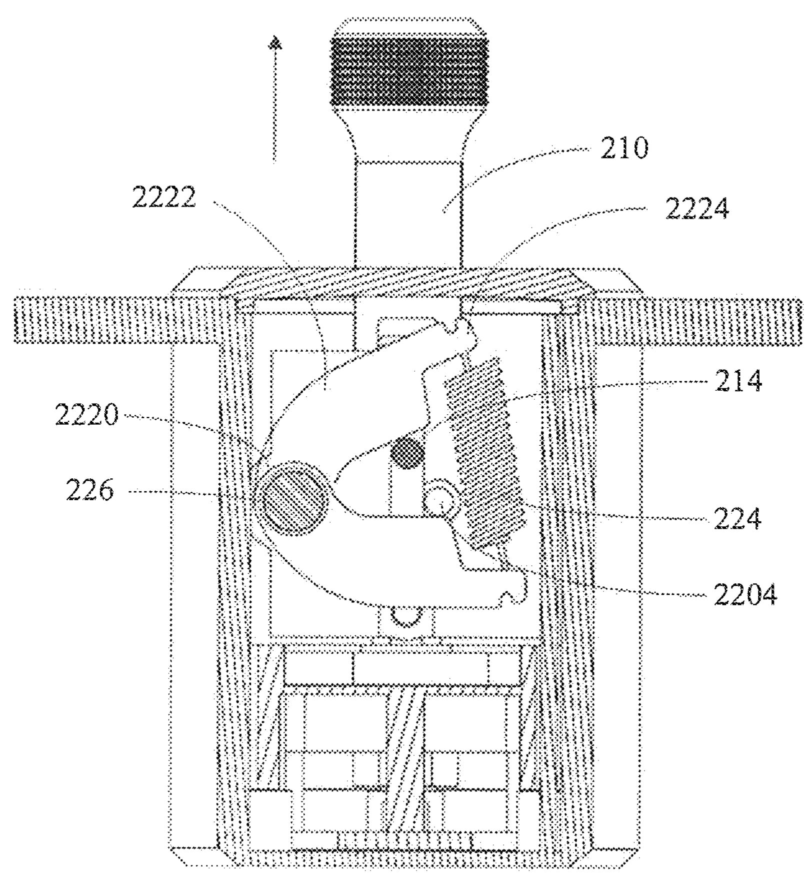
FIG. 22 is a sectional diagram of a rocking lever device according to an embodiment of the present invention, the operating lever assembly being moved along a first direction.

Referring to FIG. 22, when a pulling force is applied to the first rod 210 so that the pin shaft 214 perform a linear movement together with the first rod 210 along the first direction (for example, an upward direction in FIG. 22) from an initial position of the pin shaft, the first limiting post 2204 abuts against one of the abutting portions 2222, the pin shaft 214 drives the other abutting portion 222 to open along the first direction, and the elastic element 224 is extended. The first magnetic element 23 is driven by the first rod 210 from an initial position of the first magnetic element to perform a linear movement along the first direction. The first magnetic sensor 242 senses a change in a magnetic field of the first magnetic element 23 and obtains a moving position of the first magnetic element 23 along the first direction. The first circuit board 24 generates a remote-control instruction according to the moving position of the first magnetic element 23 obtained through the first magnetic sensor 242. The remote control 200 sends the remote-control instruction to the controlled motorized device, so that the motorized device performs a linear direction along the first direction.

Figure 23:
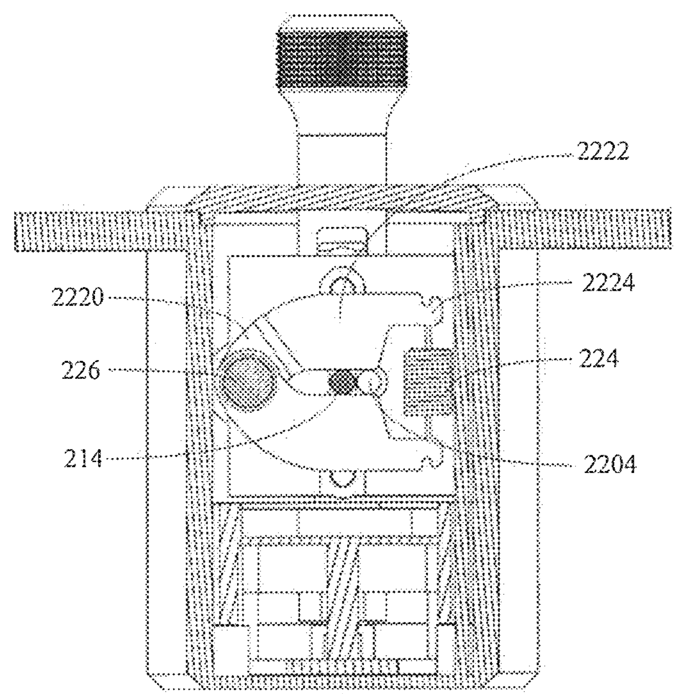
FIG. 23 is a sectional diagram of a rocking lever device according to an embodiment of the present invention, the operating lever assembly being reset to an initial position thereof.

Referring to FIG. 23, When the pulling force applied to the first rod 210 disappears, the stretched elastic element 224 returns to an original state, and the opened swinging block 222 is pulled to reset, so as to drive the pin shaft 214, the first rod 210 and the first magnetic element 23 to reset, so that the first magnetic element 23 is moved to an initial position thereof along the second direction.

Figure 24:
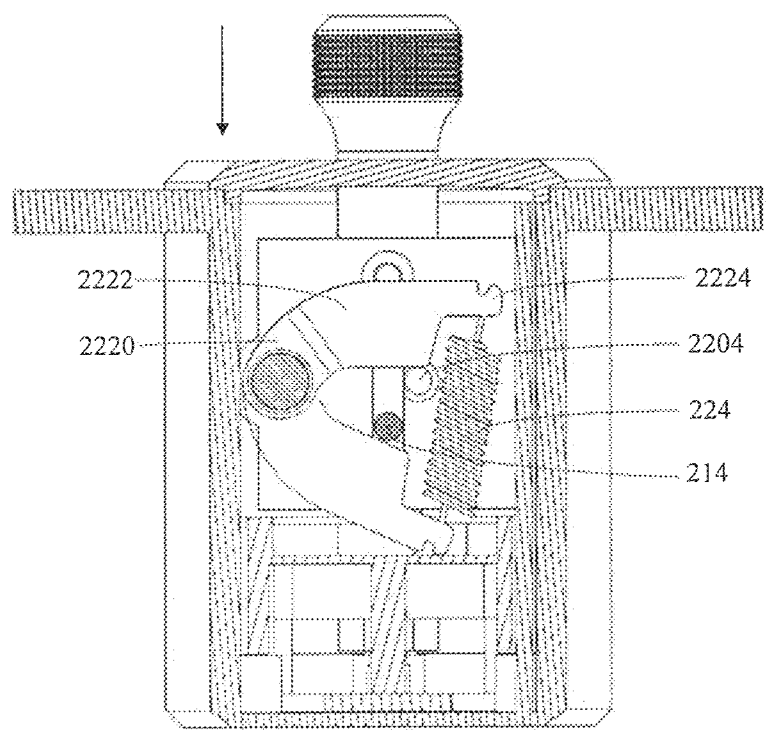
FIG. 24 is a sectional diagram of a rocking lever device according to an embodiment of the present invention, the operating lever assembly being moved along a second direction.

Referring to FIG. 24, when a pushing three is applied to the first rod 210 so that the pin shaft 214 perform a linear direction together with the first rod 210 along the second direction (for example, a downward direction in FIG. 24) from an initial position of the pin shaft, the first limiting post 2204 abuts against one of the abutting portions 2222, the pin shaft 214 drives the other abutting portion 2222 to open along the second direction, and the elastic element 224 is extended. The first magnetic element 23 is driven by the first rod 210 from an initial position of the first magnetic element to perform a linear direction along the second direction. The first magnetic sensor 242 senses a change in a magnetic field of the first magnetic element 23 and obtains a moving position of the first magnetic element 23 along the second direction. The first circuit board 24 generates a remote-control instruction according to the moving position of the first magnetic element 23 obtained through the first magnetic sensor 242. The remote control 200 sends the remote-control instruction to the controlled motorized device, so that the motorized device performs a linear movement along the second direction.

When the pushing force applied to the first rod 210 disappears, the stretched elastic element 224 returns to an original state, and the opened swinging block 222 is pulled to reset, so as to drive the pin shaft 214, the first rod 210 and the first magnetic element 23 to reset, so that the first magnetic element 23 is moved to an initial position thereof along the first direction.

Figure 25:
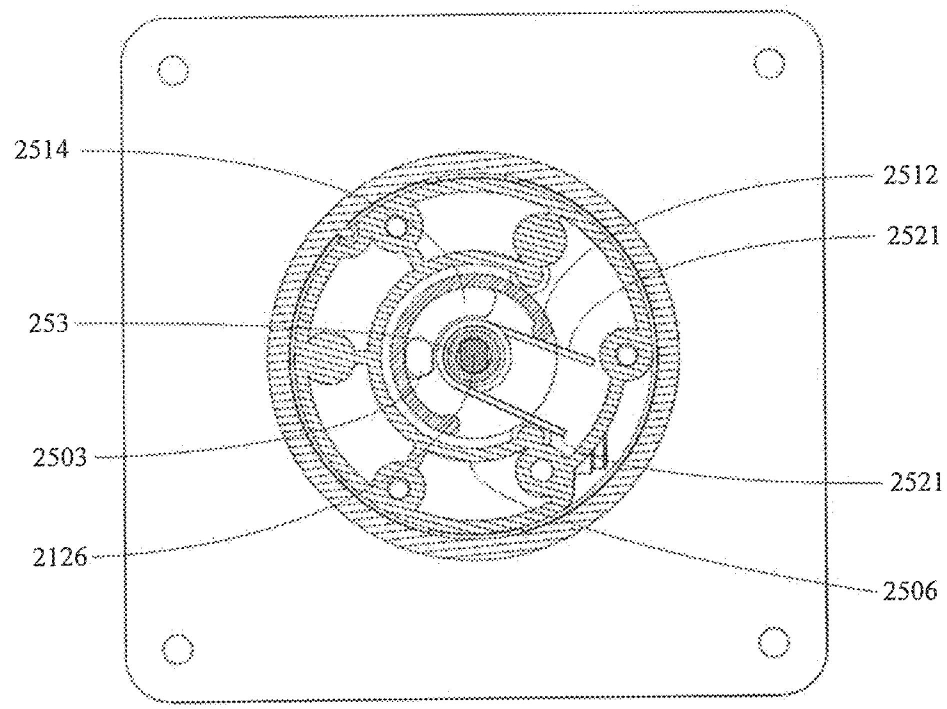
FIG. 25 is a sectional diagram of a rocking lever device according to an embodiment of the present invention, the operating lever assembly being rotated along a third direction or a fourth direction.
Figure 26:
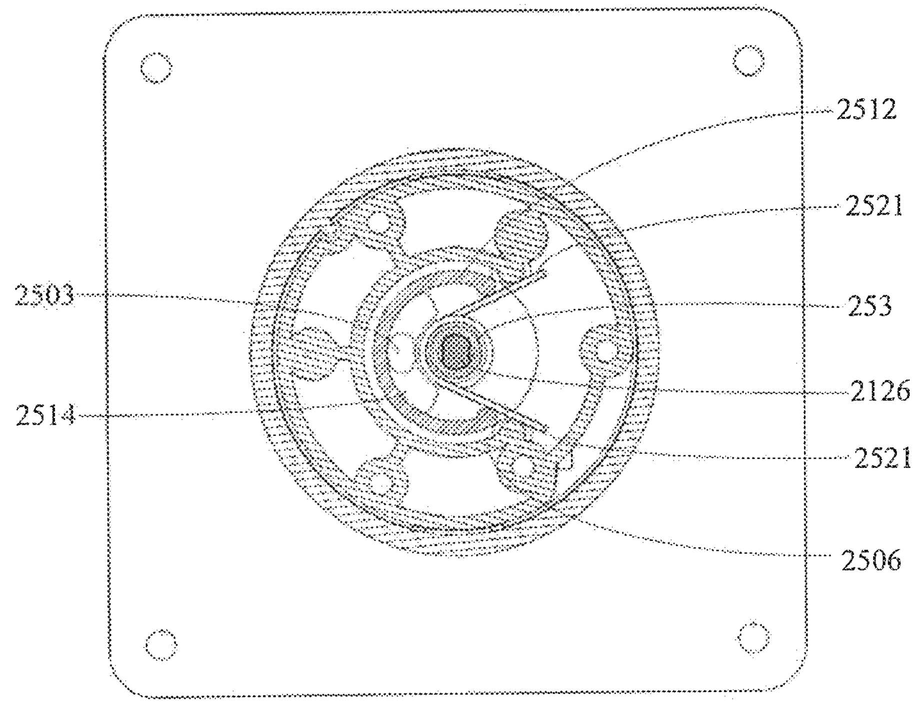
FIG. 26 is a sectional diagram of a rocking lever device according to an embodiment of the present invention, the operating lever assembly being reset to an initial position thereof along a third direction or a fourth direction.

Referring to FIG. 25 and FIG. 26, a torsion force is applied to the first rod 210, so that the first rod 210 drives the second rod 212, the first resetting assembly 22 and the first circuit board 24 to rotate along the third rotation direction or the fourth rotation direction, and the connecting end 2126 drives the rotating member 251 and the fixing member 253 to rotate along the third rotation direction or the third rotation direction relative to the connecting frame 250 and the second circuit board 27.

When the fixing member 253 rotates along the third rotation direction or the fourth rotation direction relative to the second circuit board 27, the second magnetic element 26 rotates along the third rotation direction or the fourth rotation direction from an initial position of the second magnetic element relative to the second magnetic sensor 272. The second magnetic sensor 272 senses a change in a magnetic field of the second magnetic element 26 and obtains rotation amount of the second magnetic element 23 along the third rotation direction or the fourth rotation direction. The second circuit board 27 generates a remote-control instruction according to the rotation amount of the second magnetic element 26 obtained through the second magnetic sensor 272. The remote control 200 sends the remote-control instruction to the controlled motorized device, so that the motorized device is rotated along the third rotation direction or the fourth rotation direction.

When the rotating member 251 is rotated relative to the connecting frame 250, one of the torsion spring anus 2521 is pushed from one end of the arc-shaped outer side wall 2512, and is close to another torsion spring arm 2521 and one end of the arc-shaped inner side wall 2506 along the third rotation direction or the fourth rotation direction. The one end of the arc-shaped outer side wall 2512 and the one end of the arc-shaped inner side wall 2506 squeeze the two torsion springs arms 2521, respectively, so that the torsion spring 252 is compressed.

When a torsion force applied to the first rod 210 disappears, the torsion spring 252 returns to an original state thereof, the two torsion spring arms 2521 push one end of the arc-shaped outer side wall 2512 and one end of the arc-shaped inner side wall 2506, respectively, the rotating member 251 is rotated along the fourth rotation direction or the third rotation direction relative to the connecting frame 250 to drive the fixing member 253, and the first rod 210, the second rod 212, the first resetting assembly 22 and the first circuit board 24 are reset along the fourth rotation direction or the third rotation direction, so that the second magnetic element 26 is rotated to an original position thereof along the fourth rotation direction or the third direction.

Figure 27:
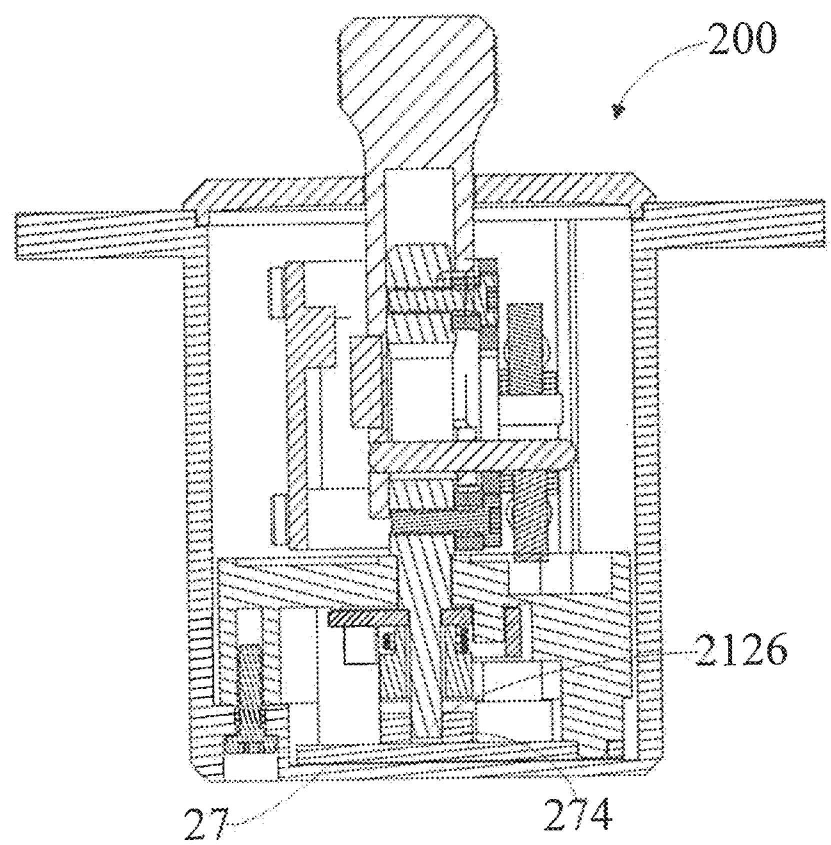
FIG. 27 is a sectional diagram of a rocking lever device according to another embodiment of the present invention.

Referring to FIG. 27, a structure of a first rocking lever device 300 provided according to another embodiment of the present invention is basically the same as the structure of the first rocking lever device 100 provided according to the foregoing embodiment, and differences are as follows: For the first rocking lever device 300, a potentiometer 274 is adopted to replace the magnetic sensor 272 of the first rocking lever device 100.

The potentiometer 274 is disposed on the circuit board 27, and the connecting end 2126 is inserted into the potentiometer 274 and is in contact with the potentiometer 274. The potentiometer 274 includes a resistor, and the connecting end 2126 includes a brush.

When the connecting end 2126 is rotated along the third rotation direction or fourth rotation direction relative to the potentiometer 274 and the second circuit board 27, the potentiometer 274 obtains rotation amount of the connecting end 2126 along the third rotation direction or the fourth rotation direction according to a change in a resistance value or voltage. The circuit board 27 generates a corresponding remote-control instruction, and the remote control 200 sends the remote-control instruction to the controlled motorized device, so that the motorized device is rotated along the third rotation direction or the fourth rotation direction.

The first rocking lever device 300 may replace the first rocking lever device 100 provided according to the foregoing embodiment, and is mounted to the housing 402.

In the first rocking lever devices 100, 300 of the embodiment of the present invention, the first rod 210 only performs movements along four directions: linear movements along the first direction and the second direction and rotations along the third rotation direction and the fourth rotation direction, which are simple to operate and easily to be remembered by the user. In addition, when a force applied to the first rod 210 disappears, the first resetting assembly 22 or the second resetting assembly 25 may reset the first rod 210, further simplifying an operation of the first rocking lever device 100.

A rod of the second rocking lever device 200 is configured to move, so as to trigger the remote control 400 to generate a remote-control instruction of translation. The remote-control instruction of translation is used to control the motorized device to move within a horizontal plane. For example, a swinging structure in the prior art may be adopted in the second rocking lever device 200. When a rod of the second rocking lever device 200 moves forward, backward, leftward or rightward relative to the user, the remote control 400 is triggered to generate the remote-control instruction of translation. The remote-control instruction of translation instructs the motorized device to move forward, backward, leftward or rightward.

In some embodiments, the motorized device is an unmanned aerial vehicle, and the remote control 400 is used to control the unmanned aerial vehicle. When the first rod 210 performs a linear motion along the first direction (for example, the upward direction in FIG. 22), the remote control 400 controls the unmanned aerial vehicle to rise. When the first rod 210 performs a linear motion along the second direction (for example, the downward direction in FIG. 24), the remote control 400 controls the unmanned aerial vehicle to fall. When the first rod 210 rotates along the third rotation direction or the fourth rotation direction, the remote control 400 controls the unmanned aerial vehicle to auto-rotate leftward or rightward.

A movement direction of the first rod 210 corresponds to a movement direction of the unmanned aerial vehicle, so that the operation of the remote control 400 is simple and directly viewed. The first rod 210 is only moved along four directions, which is easily remembered by the user. In addition, when the force applied to the first rod 210 disappears, the first resetting assembly 22 or the second resetting assembly 25 may reset the first rod 210, further simplifying an operation of the first remote control device 400.

It should be finally noted that the above embodiments are merely intended for describing the technical solutions of the present invention rather than limiting the present invention. Based on the idea of the present invention, the technical features in the foregoing embodiments or different embodiments may be combined, the steps may be implemented in any order, and many other changes in the different aspects of the present invention as described above may exist. For brevity, such changes are not provided in the detailed descriptions. Although the present invention is described in detail with reference to the foregoing embodiments, those of ordinary skill in the art should understand that they can still make modifications to the technical solutions described in the foregoing embodiments or make equivalent substitutions to some technical features thereof, without departing from scope of the technical solutions of the embodiments of the present invention.

What is claimed is:

1. A remote control, configured to remotely control a motorized device, wherein the remote control comprises:

a first rocking lever device, a rod of the first rocking lever device being configured to perform a linear motion along a first direction or a second direction, so as to trigger the remote control to generate a first remote control instruction or a second remote control instruction, the rod of the first rocking lever device being further configured to be rotated along a third rotation direction or a fourth rotation direction, so as to trigger the remote control to generate a third remote control instruction or a fourth remote control instruction, the first direction being opposite to the second direction, the third rotation direction being opposite to the fourth rotation direction, the first remote control instruction being used to control the motorized device to perform a linear motion along the first direction, the second remote control instruction being used to control the motorized device to perform a linear motion along the second direction, the third remote control instruction being used to control the motorized device to auto-rotate along the third rotation direction, and the fourth remote control instruction being used to control the motorized device to auto-rotate along the fourth rotation direction;

a second rocking lever device;

a processor, the processor being connected to the first rocking lever device and the second rocking lever device, and being configured to process the first remote control instruction, the second remote control instruction, the third remote control instruction and the fourth remote control instruction; and a signal transmitting device, the signal transmitting device being connected to the processor and being configured to receive and send the first remote control instruction, the second remote control instruction, the third remote control instruction and the fourth remote control instruction that are processed by the processor.

2. The remote control according to claim 1, wherein the first rocking lever device comprises:

an operating lever assembly;

a first magnetic element, the first magnetic element being mounted to the operating lever assembly; and a first circuit board comprising a first magnetic sensor, the first magnetic sensor facing the first magnetic element, wherein the first magnetic element may be driven by the operating lever assembly from an initial position of the first magnetic element to perform a linear movement along the first direction or the second direction relative to the first magnetic sensor.

3. The remote control according to claim 2, wherein the first rocking lever device comprises:

a second magnetic element, the second magnetic element being mounted to the operating lever assembly; and a second circuit board comprising a second magnetic sensor, the second magnetic sensor facing the second magnetic element, wherein the second magnetic element may be driven by the operating lever assembly from an initial position of the second magnetic element to be rotated along the third rotation direction or the fourth rotation direction relative to the second magnetic sensor.

4. The remote control according to claim 3, wherein the first rocking lever device comprises a first resetting assembly, the first resetting assembly being connected to the operating lever assembly, and the first resetting assembly being configured to reset the operating lever assembly along the second direction or the first direction, so that the first magnetic element is reset to an initial position thereof.

5. The remote control according to claim 4, wherein the first rocking lever device comprises a second resetting assembly, the second resetting assembly being connected to the operating lever assembly, and the second resetting assembly being configured to reset the operating lever assembly along the fourth rotation direction or the third rotation direction, so that the second magnetic element is reset to an initial position thereof.

6. The remote control according to claim 5, wherein the operating lever assembly comprises a first rod, a second rod and a pin shaft;

central shafts of the first rod and the second rod being both disposed along the first direction and the second direction; wherein an accommodating channel and a pin hole are disposed at the first rod, the accommodating channel being disposed along an axial direction of the first rod, and the pin hole being disposed at an outer side wall of the first rod;

a sliding groove is disposed on an outer side wall of the second rod, the sliding groove being disposed along an axial direction of the second rod, and the second rod being partially accommodated in the accommodating channel and moving along the axial direction thereof relative to the first rod; and one end of the pin shaft passes through the pin hole and is accommodated in the sliding groove.

7. The remote control according to claim 6, wherein the second rod is connected to the first resetting assembly and the second resetting assembly; and the first magnetic element is mounted to the first rod, the first rod, the pin shaft and the first magnetic element performing the linear movement along the first direction or the second direction relative to the second rod; and the first resetting assembly being configured to drive the pin shaft to be reset along the first direction or the second direction, so that the first magnetic element is reset to an initial position thereof.

8. The remote control according to claim 7, wherein the first resetting assembly comprises a fixing frame, a swinging block and an elastic element;

the fixing frame comprising a first limiting post and being provided with a first guide groove;

there being two swinging blocks, one end of one swinging block and one end of the other swinging block being jointly hinged to the fixing frame;

two ends of the elastic element being connected to the other end of each of the swinging blocks, respectively;

the second rod being fixedly mounted to the fixing frame; and the pin shaft passing through the first guide groove, and moving along the first direction or the second direction within the first guide groove, and the pin shaft and the first limiting post being located between the two swinging blocks.

9. The remote control according to claim 8, wherein each of the swinging blocks comprises a hinging end, an abutting portion and a free end, the abutting portion being located between the hinging end and the free end;

two hinging ends of the two swinging blocks being jointly hinged to the fixing frame;

two ends of the elastic element being connected to the two free ends of the two swinging blocks, respectively; and the pin shaft and the first limiting post are disposed side by side between the two abutting portions of the two swinging blocks.

10. The remote control according to claim 8, wherein the first circuit board is fixedly mounted to the fixing frame;

a lever channel being disposed at the fixing frame, the first rod and the second rod being partially accommodated in the lever channel;

the second rod being connected to the second resetting assembly and the second magnetic element, wherein the second magnetic element may be driven by the second rod from an initial position of the second magnetic element to rotate along the third rotation direction or the fourth rotation direction relative to the second magnetic sensor;

and the second resetting assembly is configured to reset the second rod along the fourth rotation direction or the third rotation direction, so that the second magnetic element is reset to an initial position thereof.

11. The remote control according to claim 10, wherein the second resetting assembly comprises a connecting frame, a rotating member and a torsion spring;

the connecting frame comprising a bottom, a second limiting post and an arc-shaped inner side wall, wherein the arc-shaped inner side wall is connected to the bottom, one end of the second limiting post being connected to the bottom;

the rotating member comprising a bottom plate and an arc-shaped outer side wall, wherein the arc-shaped outer side wall is connected to the bottom plate; an arc-shaped second guide groove being disposed at the bottom plate, a gap being formed between two ends of the arc-shaped side wall;

the second limiting post passing through the second guide groove;

the torsion spring being partially accommodated in a space defined by the arc-shaped outer side wall, the torsion spring comprising two torsion spring arms, the two torsion spring arms passing through the gap and respectively abutting against both ends of the arc-shaped outer side wall; and the second rod passing through the connecting frame and the rotating member, and the second rod driving the rotating member to rotate along the third direction or the fourth direction relative to the connecting frame.

12. The remote control according to claim 11, wherein the second rod comprises a connecting end, the connecting end being fixedly connected to the second magnetic element.

13. The remote control according to claim 12, wherein the second resetting assembly comprises a fixing member, the second magnetic element being mounted to the fixing member, and the connecting end being fixedly connected to the fixing member.

14. The remote control according to claim 11, wherein the second circuit board is fixedly connected to the connecting frame.

15. The remote control according to claim 3, wherein the first magnetic sensor and the second magnetic sensor are both Hall elements.

16. The remote control according to claim 1, wherein a rod of the second rocking lever device is configured to move, so as to trigger the remote control to generate a remote control instruction of translation, the remote control instruction of translation being used to control the motorized device to move in a horizontal plane.

17. A motorized device, comprising a fuselage, and further comprising the remote control configured to remotely control a motorized device, wherein the remote control comprises:

a first rocking lever device, a rod of the first rocking lever device being configured to perform a linear motion along a first direction or a second direction, so as to trigger the remote control to generate a first remote control instruction or a second remote control instruction, the rod of the first rocking lever device being further configured to be rotated along a third rotation direction or a fourth rotation direction, so as to trigger the remote control to generate a third remote control instruction or a fourth remote control instruction, the first direction being opposite to the second direction, the third rotation direction being opposite to the fourth rotation direction, the first remote control instruction being used to control the motorized device to perform a linear motion along the first direction, the second remote control instruction being used to control the motorized device to perform a linear motion along the second direction, the third remote control instruction being used to control the motorized device to auto-rotate along the third rotation direction, and the fourth remote control instruction being used to control the motorized device to auto-rotate along the fourth rotation direction;

a second rocking lever device;

a processor, the processor being connected to the first rocking lever device and the second rocking lever device, and being configured to process the first remote control instruction, the second remote control instruction, the third remote control instruction and the fourth remote control instruction; and a signal transmitting device, the signal transmitting device being connected to the processor and being configured to receive and send the first remote control instruction, the second remote control instruction, the third remote control instruction and the fourth remote control instruction that are processed by the processor, the remote control being communicatively connected to the fuselage and being configured to control a flight status of the fuselage according to a remote control instruction generated by the first rocking lever device and the second rocking lever device; wherein the first remote control instruction is used to control the motorized device to perform a linear motion along the first direction, the second remote control instruction is used to control the motorized device to perform a linear motion along the second direction, the third remote control instruction is used to control the motorized device to auto-rotate along the third rotation direction, and the fourth remote control instruction is used to control the motorized device to auto-rotate along the fourth rotation direction.

18. The motorized device according to claim 17, wherein a rod of the second rocking lever device of the remote control is configured to move, so as to trigger the remote control to generate a remote control instruction of translation; wherein the remote control instruction of translation is used to control the motorized device to move within a horizontal plane.

19. The motorized device according to claim 17, wherein the motorized device is an unmanned aerial vehicle.

* * * * *